(12) United States Patent
Osawa et al.

(10) Patent No.: US 10,039,973 B2
(45) Date of Patent: Aug. 7, 2018

(54) MANIPULATOR AND MANIPULATION APPARATUS

(71) Applicant: Sony Computer Entertainment Inc., Tokyo (JP)

(72) Inventors: Hiroshi Osawa, Kanagawa (JP); Takeshi Yamagishi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 1086 days.

(21) Appl. No.: 14/366,485

(22) PCT Filed: Nov. 13, 2012

(86) PCT No.: PCT/JP2012/079387
§ 371 (c)(1),
(2) Date: Jun. 18, 2014

(87) PCT Pub. No.: WO2013/099459
PCT Pub. Date: Jul. 4, 2013

(65) Prior Publication Data
US 2014/0323219 A1  Oct. 30, 2014

(30) Foreign Application Priority Data

Dec. 29, 2011 (JP) ................................. 2011290317

(51) Int. Cl.
*H01C 10/00* (2006.01)
*A63F 13/00* (2014.01)
(Continued)

(52) U.S. Cl.
CPC ............... *A63F 13/00* (2013.01); *G01L 5/16* (2013.01); *G01L 5/223* (2013.01); *G05G 9/047* (2013.01);
(Continued)

(58) Field of Classification Search
CPC ............. G05G 9/047; G05G 9/04737; G05G 2009/04762; G05G 2009/0474; A63F 13/00; G01L 5/16; G01L 5/223
(Continued)

(56) References Cited

U.S. PATENT DOCUMENTS

| 5,222,400 A | * | 6/1993 | Hilton | ..................... G01L 1/248 |
| | | | | 73/862.043 |
| 5,377,950 A | * | 1/1995 | Salcudean | .................. B25J 3/04 |
| | | | | 248/550 |

(Continued)

FOREIGN PATENT DOCUMENTS

| CN | 2133017 Y | 5/1993 |
| CN | 101243371 A | 8/2008 |

(Continued)

OTHER PUBLICATIONS

Office Action for corresponding CN application No. 201280070425. 9, dated Apr. 1, 2015.
International Search Report for corresponding application No. PCT/JP2012/079387, dated Dec. 25, 2012.
International Preliminary Report and Written Opinion for corresponding application No. PCT/JP2012/079387, dated Jul. 10, 2014.

*Primary Examiner* — Kyung Lee
(74) *Attorney, Agent, or Firm* — Matthew B. Dernier, Esq.

(57) ABSTRACT

A manipulator includes a manipulation body having a plurality of bar-shaped portions which intersect orthogonally with each other at one intersection point, and a plurality of detection bodies which detect a displacement of the manipulation body. The plural bar-shaped portions include a bar-shaped portion and another bar-shaped portion which intersect orthogonally with each other. The plural detection bodies include a first detection body which detects a displacement of one end side of the bar-shaped portion with respect to the intersection point, a second detection body which detects a displacement of the other end side of the bar-shaped portion with respect to the intersection point, and (Continued)

a third detection body which detects a displacement of one end side of the bar-shaped portion with respect to the intersection point.

7 Claims, 16 Drawing Sheets

(51) Int. Cl.
  *G01L 5/16*    (2006.01)
  *G05G 9/047*   (2006.01)
  *G01L 5/22*    (2006.01)
  *G05G 25/00*   (2006.01)

(52) U.S. Cl.
  CPC ...... *A63F 2300/1043* (2013.01); *G05G 25/00* (2013.01)

(58) Field of Classification Search
  USPC .......................................................... 338/68
  See application file for complete search history.

(56) References Cited

U.S. PATENT DOCUMENTS

| | | | |
|---|---|---|---|
| 5,798,748 A | 8/1998 | Hilton | |
| 6,087,925 A * | 7/2000 | DeVolpi | H01C 10/06 338/47 |
| 6,349,604 B1 * | 2/2002 | Byun | G01L 5/161 73/862.043 |
| 6,593,909 B1 * | 7/2003 | Chou | G05G 9/047 200/6 A |
| 6,909,353 B2 * | 6/2005 | Romero Herrera | G05G 9/047 338/12 |
| 2005/0264183 A1 | 12/2005 | Seo et al. | |
| 2009/0131171 A1 | 5/2009 | Miyazaki | |

FOREIGN PATENT DOCUMENTS

| | | |
|---|---|---|
| JP | 1991056993 | 5/1991 |
| JP | 11-511244 A | 9/1999 |
| JP | 2004071451 A | 3/2004 |
| JP | 2006286335 A | 10/2006 |

* cited by examiner

MANIPULATOR AND MANIPULATION APPARATUS

TECHNICAL FIELD

The present invention relates to a manipulator and a manipulation apparatus.

BACKGROUND ART

Conventionally, a manipulation apparatus is known which is connected to an information processing apparatus such as a PC (Personal Computer) or a game apparatus and transmits a manipulation signal to the information processing apparatus (refer to, for example, PTL 1). A controller (manipulation apparatus) disclosed in Patent Document 1 has a left side gripping unit and a right side gripping unit which are gripped by the left and right hands of a user, and a direction key and an operation button disposed on the front face of the controller. From among the components, the direction key is disposed at a position corresponding to the thumb of the left hand when the left side gripping unit is gripped by the left hand, and the operation button is disposed at a position corresponding to the thumb of the right hand when the right side gripping unit is gripped by the right hand. Further, the controller includes two analog sticks provided between the regions in which the direction key and the operation button are disposed.

Such analog sticks have a joystick structure of two orthogonal axes, and each analog stick is provided for semispherical displacement. Thus, if the analog stick is operated, then the controller outputs an operation signal corresponding to the direction of the displacement.

CITATION LIST

Patent Literature

[PTL 1]
U.S. Patent Application Publication No. 2009/0131171

SUMMARY

Technical Problem

In recent years, a large number of pieces of software such as game software in which complicated operations are required are distributed. For example, in a game called FPS (First Person shooter), while a character is moved, an operation for changing the line of sight of the character or an operation for changing the aiming at the target is carried out. On the other hand, the controller described in PTL 1 mentioned hereinabove detects an upward, downward, leftward or downward direction by the direction key and detects the panning and tilting directions by the analog stick. However, a controller (manipulation apparatus) is demanded which is compatible with game software in which further complicated operations are required and various operation directions can be detected by a single manipulator.

The present invention resides in provision of a manipulator and a manipulation apparatus by which a greater number of operation directions can be detected.

Solution to Problem

In order to attain the object described above, a manipulator according to one mode of the present invention is characterized in that the manipulator includes a manipulation body having a plurality of bar-shaped portions which intersect orthogonally with each other at one intersection point, and a plurality of detection bodies which detect a displacement of the manipulation body, the plural bar-shaped portions including a first bar-shaped portion and a second bar-shaped portion which intersect orthogonally with each other, the plural detection bodies including a first detection body which detects a displacement of one end side of the first bar-shaped portion with respect to the intersection point, a second detection body which detects a displacement of the other end side of the first bar-shaped portion with respect to the intersection point, and a third detection body which detects a displacement of one end side of the second bar-shaped portion with respect to the intersection point.

Meanwhile, a manipulation apparatus according to the one mode of the present invention is characterized in that the manipulation apparatus includes the manipulator described above.

DESCRIPTION OF EMBODIMENTS

First Embodiment

In the following, a first embodiment according to a mode of the present invention is described with reference to the drawings.

Figure 1:
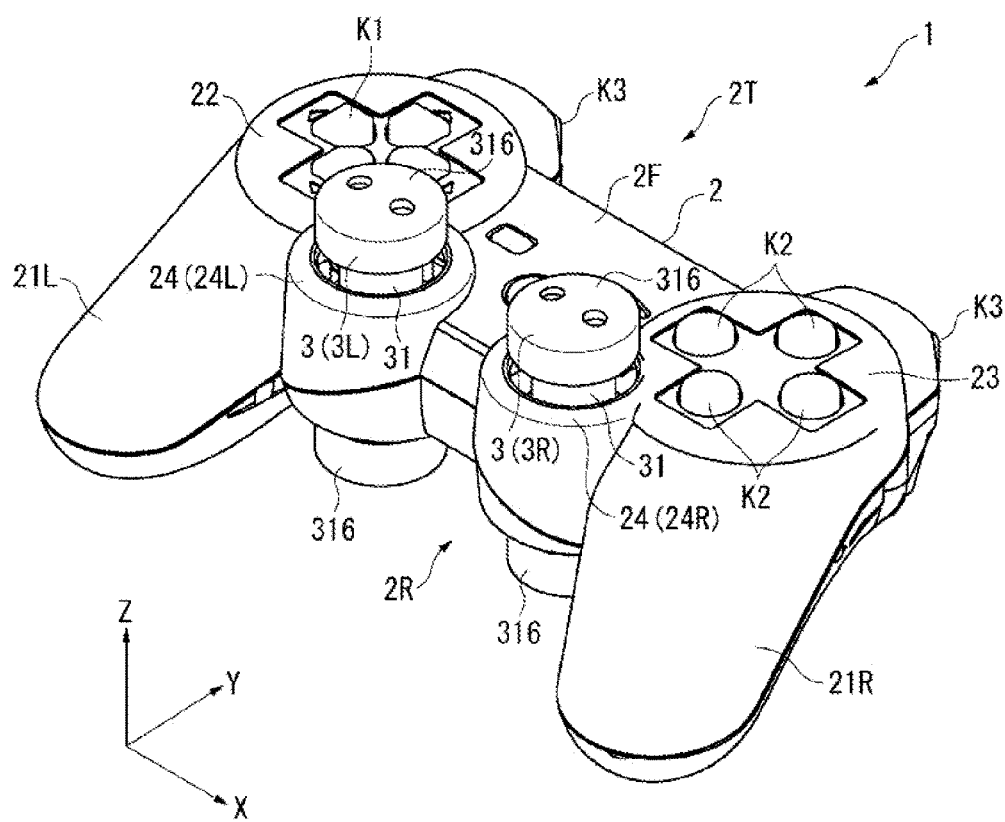
FIG. 1 is a perspective view depicting a manipulation apparatus of a first embodiment according to a mode of the present invention.

FIG. 1 is a perspective view depicting a manipulation apparatus 1 according to the present embodiment. It is to be noted that, in the succeeding figures, the X direction and the Y direction indicate a rightward direction and an upward direction, respectively, when an exterior housing 2 is viewed in front elevation, and the Z direction is a direction toward this side when the exterior housing 2 is viewed in front elevation. In particular, the X, Y and Z directions are directed orthogonally to each other.

The manipulation apparatus 1 according to the present embodiment is connected to an information processing apparatus such as a PC or a game apparatus and transmits a manipulation signal to the information processing apparatus in response to an inputting operation. As depicted in FIG. 1, this manipulation apparatus 1 has the exterior housing 2 made of synthetic resin, and a pair of manipulators 3 (left side and right side manipulators in FIG. 1 are represented by 3L and 3R, respectively) provided on the exterior housing 2.

[Configuration of the Exterior Housing]

The exterior housing 2 has a left side gripping portion 21L which is gripped by the left hand of a user and a right side gripping portion 21R which is gripped by the right hand of the user. Further, at a position of the front face 2F of the exterior housing 2 corresponding to the thumb of the left hand of the user when the left side gripping portion 21L is gripped by the left hand, a first disposition region 22 in which direction keys K1 are disposed is provided. Further, at a position of the front face 2F corresponding to the thumb of the right hand of the user when the right side gripping portion 21R is gripped by the right hand, a second disposition region 23 in which four operation keys K2 are disposed is provided. Further, between the first disposition region 22 and the second disposition region 23 on the front face 2F, manipulator disposition regions 24 (left side and right side manipulator disposition regions are denoted by 24L and 24R, respectively) in which the manipulators 3 (3L and 3R) are provided are provided. Furthermore, other operation keys K3 are provided leftwardly and rightwardly on a top face 2T of the exterior housing 2, and the disposition positions of them are positions corresponding to the forefingers of the user.

From among the components mentioned, the manipulator disposition regions 24L and 24R are configured as hole portions of a circular shape as viewed in plan which communicate the front face 2F and the rear face 2R with each other, and the manipulators 3 are provided in the hole portions. Further, a bar-shaped portion 32Z (refer to FIGS. 2 and 7) of a manipulation body 31, from which the manipulators 3 (3L and 3R) are configured, is exposed at the opposite ends thereof to the outside of the exterior housing 2 from the front face 2F and the rear face 2R.

Further, when the manipulation apparatus 1 is used, the user would input, in a state in which the user grips the left side gripping portion 21L and the right side gripping portion 21R such that they are covered, for example, with the left and right palms and ring and little fingers, the operation keys K3 with the left and right forefingers and input the direction keys K1 and the operation keys K2 with the left and right thumbs. Further, when the manipulators 3L and 3R are to be operated in the state described, the manipulators 3L and 3R are operated with the left and right thumbs and, as occasion demands, the manipulators 3L and 3R are operated in such a manner as to sandwich them with the thumbs and the long fingers. Furthermore, by manipulating the manipulators 3L and 3R in such a manner as to pick them with the thumbs and the forefingers, also it is possible to pivot (rolling turn) the manipulators 3L and 3R readily around an axis of pivotal movement along the Z direction.

[General Configuration of the Manipulator]

In the following, a general configuration of each manipulator 3 is described.

Figure 2:
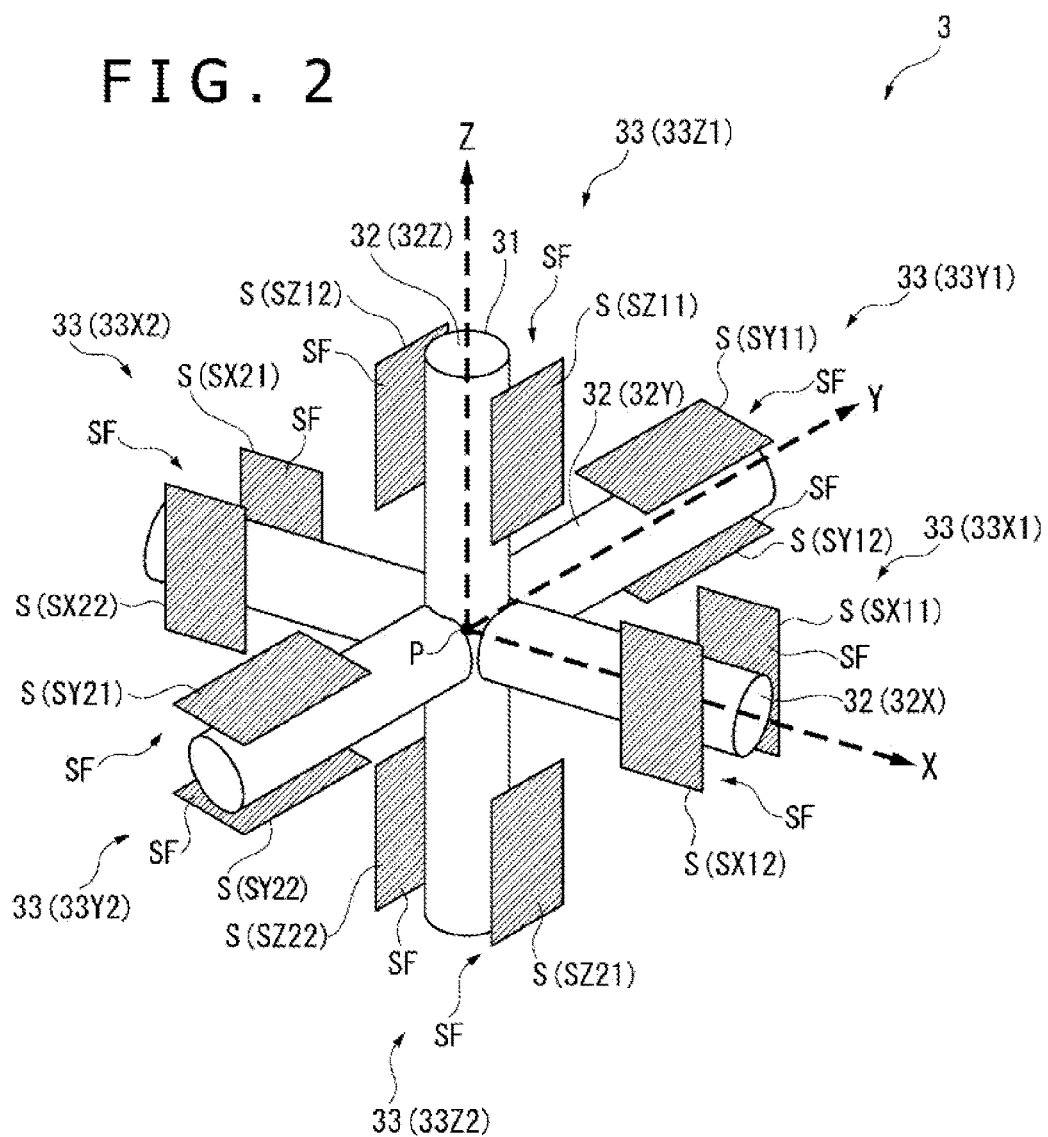
FIG. 2 is a schematic view depicting a general configuration of a manipulator in the first embodiment.

FIG. 2 is a schematic view depicting a general configuration of the manipulator 3.

As depicted in FIG. 2, the manipulator 3 has the manipulation body 31 which is operated by the user, and a plurality of detection bodies 33. Each detection body 33 detects displacements (translational movements along an XY plane, an XZ plane and a YZ plane and pivotal movements around axes of pivotal movement along the XZ plane and the YZ plane) of the manipulation body 31 and outputs a signal representative of a displacement direction of the manipulation body 31 to a control apparatus provided in the manipulation apparatus 1.

From among the members mentioned, the manipulation body 31 has three bar-shaped portions 32 (32X, 32Y and 32Z) intersecting orthogonally with each other at a single intersection point P. In particular, the manipulation body 31 has the bar-shaped portions 32X, 32Y and 32Z having center axes along the X direction, Y direction and Z direction and intersecting orthogonally with each other at the intersection point P set at the center in the directions along the center axes. Further, the user would hold a bar-shaped portion 32, which is one of the bar-shaped portions 32X, 32Y and 32Z, from above and below (from the proximal side and the distal side in the direction along the center axis of the bar-shaped portion 32) with the fingers and operate the manipulation body 31 around the intersection point P. It is to be noted that, when the manipulation body 31 is pivotally displaced, the intersection point P does not nearly move.

The bar-shaped portions 32X, 32Y and 32Z correspond to a first bar-like portion, a second bar-like portion and a third bar-like portion of the present invention, respectively.

Hereinafter, description will be made regarding the bar-shaped portion 32X as the first bar-like portion of the present invention, the bar-shaped portion 32Y as the second bar-like portion of the present invention, and the bar-shaped portion 32Z as the third bar-like portion of the present invention. Further, in the following, a configuration in which the bar-shaped portion 32Z is held and operated by the user is described.

Each of the plural detection bodies 33 has a pair of pressure-sensitive elements S disposed in an opposing relationship to each other on the corresponding bar-shaped portion 32. The paired pressure-sensitive elements S are located such that detection faces SF for detecting a pressure when the corresponding bar-shaped portion 32 is contacted are directed to the bar-shaped portion 32. The detection faces SF are located in such a manner as to sandwich the bar-shaped portion 32 therebetween and extend in parallel to each other. The gaps between the detection faces SF and the corresponding bar-shaped portion 32 have an equal dimension between the paired pressure-sensitive elements S which have the detection faces SF.

From among the detection bodies 33, the first detection body 33X1 and the second detection body 33X2 are provided corresponding to the bar-shaped portion 32X and provided at the opposite sides to each other across the intersection point P. In particular, the first detection body 33X1 is provided at one end side of the bar-shaped portion 32X in the X direction with respect to the intersection point P (at the distal side in the X direction which is a direction along the center axis of the bar-shaped portion 32X). Meanwhile, the second detection body 33X2 is provided at the other end side (at the proximal side) of the bar-shaped portion 32X in the X direction with respect to the intersection point P. The third detection body 33Y1 and the fourth detection body 33Y2 are provided corresponding to the bar-shaped portion 32Y and provided at the opposite sides to each other across the intersection point P. In particular, the third detection body 33Y1 is provided at one end side of the bar-shaped portion 32Y in the Y direction with respect to the intersection point P (at the distal side in the Y direction which is a direction along the center axis of the bar-shaped portion 32Y). Meanwhile, the fourth detection body 33Y2 is provided at the other end side (at the proximal side) of the bar-shaped portion 32Y in the Y direction with respect to the intersection point P.

Further, the fifth detection body 33Z1 and the sixth detection body 33Z2 are provided corresponding to the bar-shaped portion 32Z and provided at the opposite sides to each other across the intersection point P. In particular, the fifth detection body 33Z1 is provided at one end side of the bar-shaped portion 32Z in the Z direction with respect to the intersection point P (at the distal side in the Z direction which is a direction along the center axis of the bar-shaped portion 32Z). Meanwhile, the sixth detection body 33Z2 is provided at the other end side (at the proximal side) of the bar-shaped portion 32Z in the Z direction with respect to the intersection point P.

The paired pressure-sensitive elements S (SX11 and SX12) which the first detection body 33X1 has are disposed such that the detection faces SF thereof are opposed to the bar-shaped portion 32X as described hereinabove. More particularly, the detection faces SF of the pressure-sensitive elements SX11 and SX12 are disposed in such a manner as to sandwich the bar-shaped portion 32X therebetween. Further, each of the detection faces SF is disposed along a plane defined by the direction (X direction) along the center axis of the corresponding bar-shaped portion 32X and a direction (the Y direction or the Z direction) along the center axis of one of the bar-shaped portions 32Y and 32Z orthogonal to the bar-shaped portion 32X. It is to be noted that, in the present embodiment, the detection faces SF are disposed in parallel to each other along the XZ plane.

Similarly, the paired pressure-sensitive elements S (SX21 and SX22) which the second detection body 33X2 has are disposed such that the detection faces SF thereof are opposed to the bar-shaped portion 32X. More particularly, the detection faces SF of the pressure-sensitive elements SX21 and SX22 are disposed in such a manner as to sandwich the bar-shaped portion 32X therebetween. It is to be noted that, in the present embodiment, the detection faces SF are disposed in parallel to each other along the XZ plane.

From among the components described above, the pressure-sensitive elements SX11 and SX21 are positioned at one side in an orthogonal direction to the center axis of the bar-shaped portion 32X, namely, at the distal side in the Y direction. Meanwhile, the pressure-sensitive elements SX12 and SX22 are positioned at the other end side in the orthogonal direction, namely, at the proximal side in the Y direction.

The paired pressure-sensitive elements S (SY11 and SY12) which the third detection body 33Y1 has are located such that the detection faces SF thereof are opposed to the bar-shaped portion 32Y. More particularly, the detection faces SF of the pressure-sensitive elements SY11 and SY12 are located in such a manner as to sandwich the bar-shaped portion 32Y therebetween. Further, the detection faces SF are disposed along planes defined by a direction (Y direction) along the center axis of the corresponding bar-shaped portion 32Y and a direction (the X direction or the Z direction) along the center axis of one of the bar-shaped portions 32X and 32Z individually intersecting orthogonally with the bar-shaped portion 32Y. It is to be noted that, in the present embodiment, the detection faces SF are disposed in parallel to each other along the XY plane.

Similarly, the paired pressure-sensitive elements S (SY21 and SY22) which the fourth detection body 33Y2 has are located such that the detection faces SF thereof are opposed to the bar-shaped portion 32Y. More particularly, the detection faces SF of the pressure-sensitive elements SY21 and SY22 are disposed in such a manner as to sandwich the bar-shaped portion 32Y therebetween. It is to be noted that, in the present embodiment, the detection faces SF are disposed in parallel to each other along the XY plane.

From among the components described above, the pressure-sensitive elements SY11 and SY21 are positioned at one side in the orthogonal direction to the center axis of the bar-shaped portion 32Y, namely, at the distal side in the Z direction. Meanwhile, the pressure-sensitive elements SY12 and SY22 are positioned at the other end side in the orthogonal direction, namely, at the proximal side in the Z direction.

The paired pressure-sensitive elements S (SZ11 and SZ12) which the fifth detection body 33Z1 has are located such that the detection faces SF thereof are opposed to the bar-shaped portion 32Z. More particularly, the detection faces SF of the pressure-sensitive elements SZ11 and SZ12 are disposed in such a manner as to sandwich the bar-shaped portion 32Z therebetween. Further, the detection faces SF are disposed along a plane defined by a direction (Z direction) along the center axis of the corresponding bar-shaped portion 32Z and a direction (the X direction or the Y direction) along the center axis of one of the bar-shaped portions 32X and 32Y individually intersecting orthogonally with the bar-shaped portion 32Z. It is to be noted that, in the present embodiment, the detection faces SF are disposed in parallel to each other along the YZ plane.

Similarly, the paired pressure-sensitive elements S (SZ21 and SZ22) which the sixth detection body 33Z2 has are disposed such that the detection faces SF thereof are opposed to the bar-shaped portion 32Z. More particularly, the detection faces SF of the pressure-sensitive elements SZ21 and SZ22 are located in such a manner as to sandwich the bar-shaped portion 32Z therebetween. It is to be noted that, in the present embodiment, the detection faces SF are disposed in parallel to each other along the YZ plane.

From among the components described above, the pressure-sensitive elements SZ11 and SZ21 are positioned at one side in the orthogonal direction to the center axis of the bar-shaped portion 32Z, namely, at the distal side in the X direction. Meanwhile, the pressure-sensitive elements SZ12 and SZ22 are positioned at the other end side in the orthogonal direction, namely, at the proximal side in the X direction.

In this manner, the detection faces SF of the pressure sensitive elements SX11, SX12, SX21 and SX22 are disposed in parallel to each other along the XZ plane, and the detection faces SF of the pressure-sensitive elements SY11, SY12, SY21 and SY22 are located in parallel to each other along the XY plane. Similarly, the detection faces SF of the pressure-sensitive elements SZ11, SZ12, SZ21 and SZ22 are located in parallel to each other along the YZ plane.

Therefore, extension planes of the detection faces SF of the pressure-sensitive elements SX11, SX12, SX21 and SX22, extension planes of the detection faces SF of the pressure-sensitive elements SY11, SY12, SY21 and SY22 and extension planes of the detection faces SF of the pressure-sensitive elements SZ11, SZ12, SZ21 and SZ22 intersect orthogonally with each other.

[Behavior of the Manipulator]

In the following, a detection state of a displacement direction by the detection body 33 when the manipulation body 31 of the manipulator 3 is operated is described. When the manipulation body 31 is translationally moved along the X direction, the displacement direction of the manipulation body 31 is detected by the fifth detection body 33Z1 having the detection faces SF along the YZ plane orthogonal to the X direction and the sixth detection body 33Z2 having the detection faces SF along the plane.

In particular, if the manipulation body 31 is translationally moved toward the distal side in the X direction, then pressure is applied to the detection faces SF of the pressure-sensitive elements SZ11 and SZ21 parallel to each other by the bar-shaped portion 32Z. Therefore, the displacement of the manipulation body 31 toward the distal side in the X direction is detected by the detection bodies 33Z1 and 33Z2.

Similarly, if the manipulation body 31 is translationally moved toward the proximal side in the X direction, then pressure is applied to the detection faces SF of the pressure-sensitive elements SZ12 and SZ22 parallel to each other by the bar-shaped portion 32Z. Therefore, the displacement of the manipulation body 31 toward the proximal side in the X direction is detected by the detection bodies 33Z1 and 33Z2.

When the manipulation body 31 is translationally moved along the Y direction, the direction of the displacement of the manipulation body 31 is detected by the first detection body 33X1 having the detection faces SF along the XZ plane orthogonal to the Y direction and the second detection body 33X2 having the detection faces SF along the plane.

In particular, if the manipulation body 31 is translationally moved toward the distal side in the Y direction, then pressure is applied to the detection faces SF of the pressure-sensitive elements SX11 and SX21 parallel to each other by the bar-shaped portion 32X. Therefore, the displacement of the manipulation body 31 toward the distal side in the Y direction is detected by the detection bodies 33X1 and 33X2.

Similarly, if the manipulation body 31 is translationally moved toward the proximal side in the Y direction, then pressure is applied to the detection faces SF of the pressure-sensitive elements SX12 and SX22 parallel to each other by the bar-shaped portion 32X. Therefore, the displacement of the manipulation body 31 toward the proximal side in the Y direction is detected by the detection bodies 33X1 and 33X2.

When the manipulation body 31 is translationally moved along the Z direction, the direction of the displacement of the manipulation body 31 is detected by the third detection body 33Y1 having the detection faces SF along the XY plane orthogonal to the Z direction and the fourth detection body 33Y2 having the detection faces SF along the plane.

In particular, if the manipulation body 31 is translationally moved toward the distal side in the Z direction, then pressure is applied to the detection faces SF of the pressure-sensitive elements SY11 and SY21 parallel to each other by the bar-shaped portion 32Y. Therefore, the displacement of the manipulation body 31 toward the distal side in the Y direction is detected by the detection bodies 33Y1 and 33Y2.

Similarly, if the manipulation body 31 is translationally moved toward the proximal side in the Z direction, then pressure is applied to the detection faces SF of the pressure-sensitive elements SY12 and SY22 parallel to each other by the bar-shaped portion 32Y. Therefore, the displacement of the manipulation body 31 toward the proximal side in the Y direction is detected by the detection bodies 33Y1 and 33Y2.

When the manipulation body 31 is pivotally moved around a pivot axis along the X direction to tilt an end portion of the manipulation body 31 at the distal side in the Z direction to the distal side or the proximal side in the Y direction, the direction of the displacement of the manipulation body 31 is detected by the third detection body 33Y1 and the fourth detection body 33Y2 having the detection faces SF along the XY plane.

In particular, if the manipulation body 31 is pivoted around the pivot axis along the X direction and the end portion thereof at the distal side in the Z direction is tilted to the distal side in the Y direction, then pressure is applied to the detection faces SF of the pressure-sensitive elements SY12 and SY21 by the bar-shaped portion 32Y. Consequently, the direction of the pivotal movement of the manipulation body 31 is detected by the detection bodies 33Y1 and 33Y2.

Similarly, if the manipulation body 31 is pivoted to tilt the end portion of the manipulation body 31 at the distal side in the Z direction to the proximal side in the Y direction, then pressure is applied to the detection faces SF of the pressure-sensitive elements SY11 and SY22. Therefore, the direction of the pivotal movement of the manipulation body 31 is detected by the detection bodies 33Y1 and 33Y2.

When the manipulation body 31 is pivotally moved around a pivot axis along the Y direction to tilt an end portion of the manipulation body 31 at the distal side in the Z direction to the distal side or the proximal side in the X direction, the direction of the displacement of the manipulation body 31 is detected by the fifth detection body 33Z1 and the sixth detection body 33Z2 having the detection faces SF along the YZ plane.

In particular, if the manipulation body 31 is pivoted around the pivot axis along the Y direction and the end portion thereof at the distal side in the Z direction is tilted to the distal side in the X direction, then pressure is applied to the detection faces SF of the pressure-sensitive elements SZ11 and SZ22 by the bar-shaped portion 32Z. Consequently, the direction of the pivotal movement of the manipulation body 31 is detected by the detection bodies 33Z1 and 33Z2.

Similarly, if the manipulation body 31 is pivoted to tilt the end portion thereof at the distal side in the Z direction to the proximal side in the X direction, then pressure is applied to the detection faces SF of the pressure-sensitive elements SZ12 and SX21. Therefore, the direction of the pivotal movement of the manipulation body 31 is detected by the detection bodies 33Z1 and 33Z2.

When the manipulation body 31 is pivoted around a pivot axis along the Z direction, the direction of the displacement of the manipulation body 31 is detected by the first detection body 33X1 and the second detection body 33X2 having the detection faces SF along the XZ plane.

In particular, if the manipulation body 31 is pivoted in the counterclockwise direction (right-handed pivotal movement) as viewed from the distal side in the Z direction around the pivot axis along the Z direction, then pressure is applied to the detection faces SF of the pressure-sensitive elements SX11 and SX22 by the bar-shaped portion 32X. Therefore, the direction of the pivotal movement of the manipulation body 31 is detected by the detection bodies 33X1 and 33X2.

Similarly, if the manipulation body 31 is pivoted in the clockwise direction (left-handed pivotal movement), then pressure is applied to the detection faces SF of the pressure-sensitive elements SX12 and SX21. Therefore, the direction of the pivotal movement of the manipulation body 31 is detected by the detection bodies 33X1 and 33X2. It is to be noted that, also when displacements of the manipulation body 31 in the directions described above are combined, such displacements are detected similarly by the detection bodies 33 (33X1, 33X2, 33Y1, 33Y2, 33Z1 and 33Z2).

[Configuration of the Housing]

Figure 3:
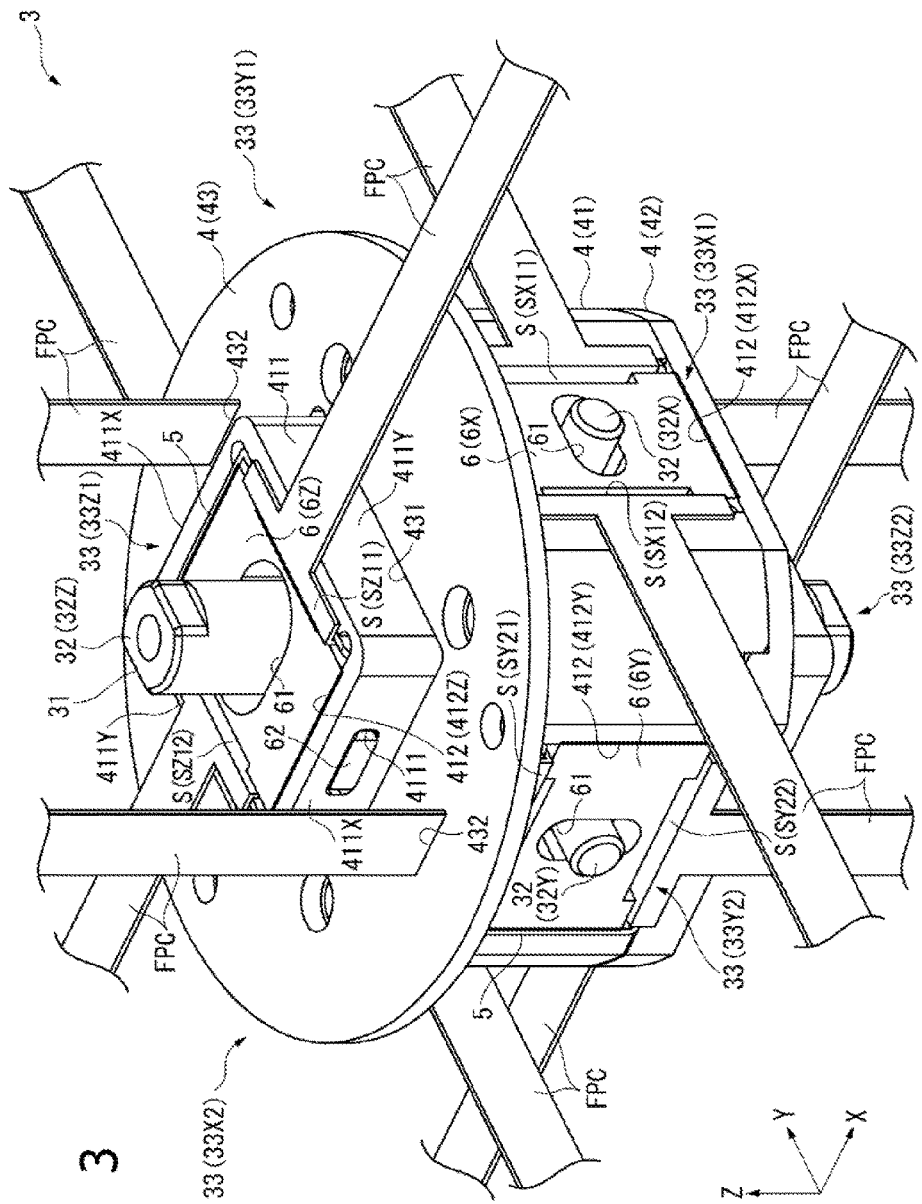
FIG. 3 is a perspective view depicting the manipulator in the first embodiment.

FIG. 3 is a perspective view of the manipulator 3 as viewed from the distal side in the Z direction and the distal side in the X direction. Besides, FIG. 4 is a perspective view of the manipulator 3 as viewed from the proximal side in the Z direction and the proximal side in the X direction.

Figure 4:
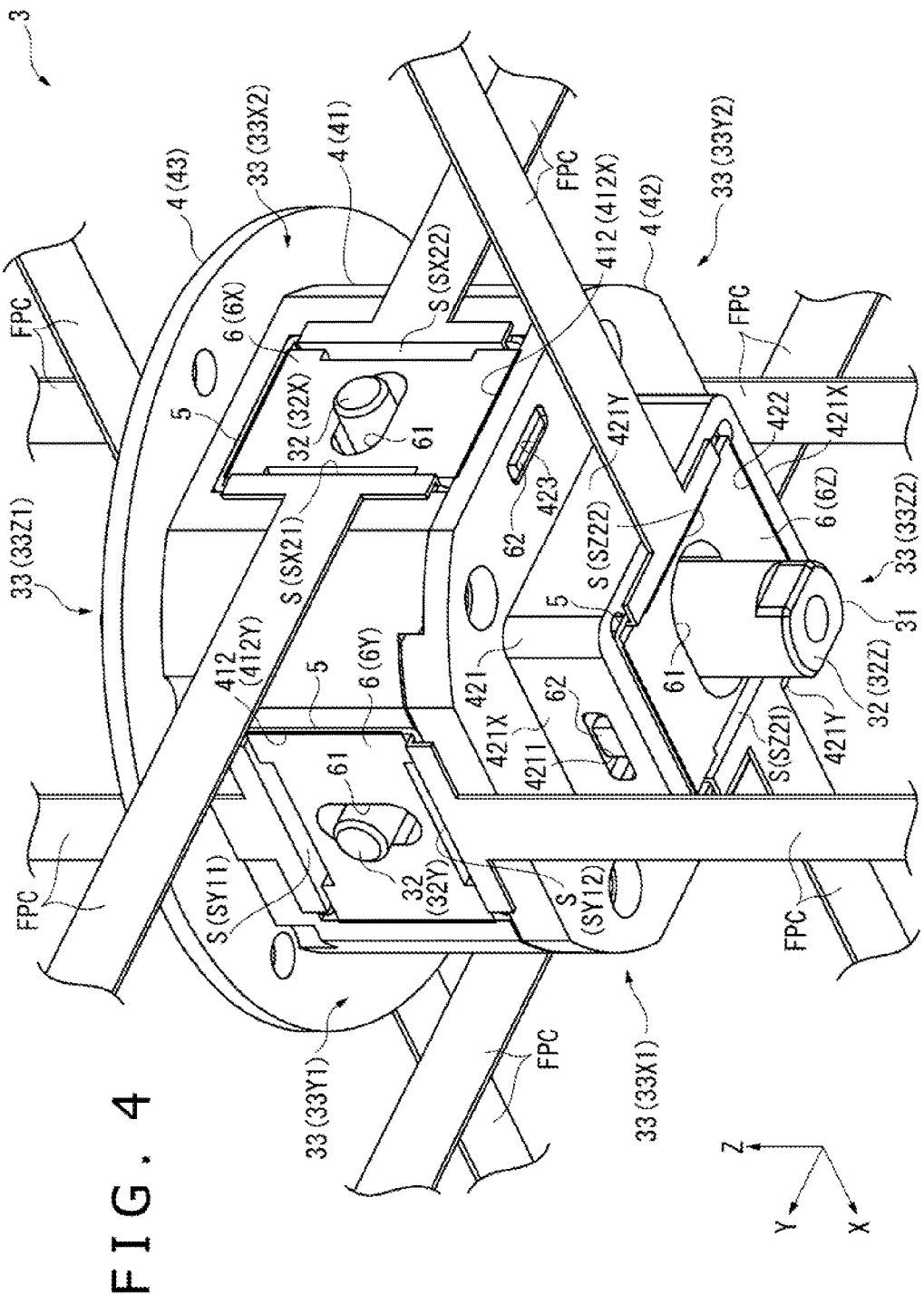
FIG. 4 is a perspective view depicting the manipulator in the first embodiment.

The manipulator 3 provided on the manipulation apparatus 1 includes, in addition to the manipulation bodies 31 and the detection bodies 33 described hereinabove, a housing 4 which contains the manipulation bodies 31 therein and to which the detection bodies 33 are attached as depicted in FIGS. 3 and 4. This housing 4 has a first housing 41, a second housing 42 attached to the first housing 41 at the proximal side in the Z direction, and a third housing 43 attached to a face 411A (refer to FIG. 5) of the first housing 41 at the distal side in the Z direction.

From among the members described, the third housing 43 is a member in the form of a flat plate having a substantially circular shape as viewed from the Z direction as depicted in FIG. 3 and is fixed to the first housing 41 by a screw not depicted. This third housing 43 has an opening 431 of a substantially rectangular shape formed at the center thereof. In this opening 431, an attaching portion 411 of the first housing 41 to which the fifth detection body 33Z1 is attached is inserted. Further, the third housing 43 has hole portions 432 individually formed therein which configure the third detection body 33Y1 and the fourth detection body 33Y2 and in which flexible printed boards (hereinafter referred to sometimes as "boards" in abbreviation) FPC connected to the pressure-sensitive elements SY11 and SY21 positioned at the distal side in the Z direction are inserted.

Figure 5:
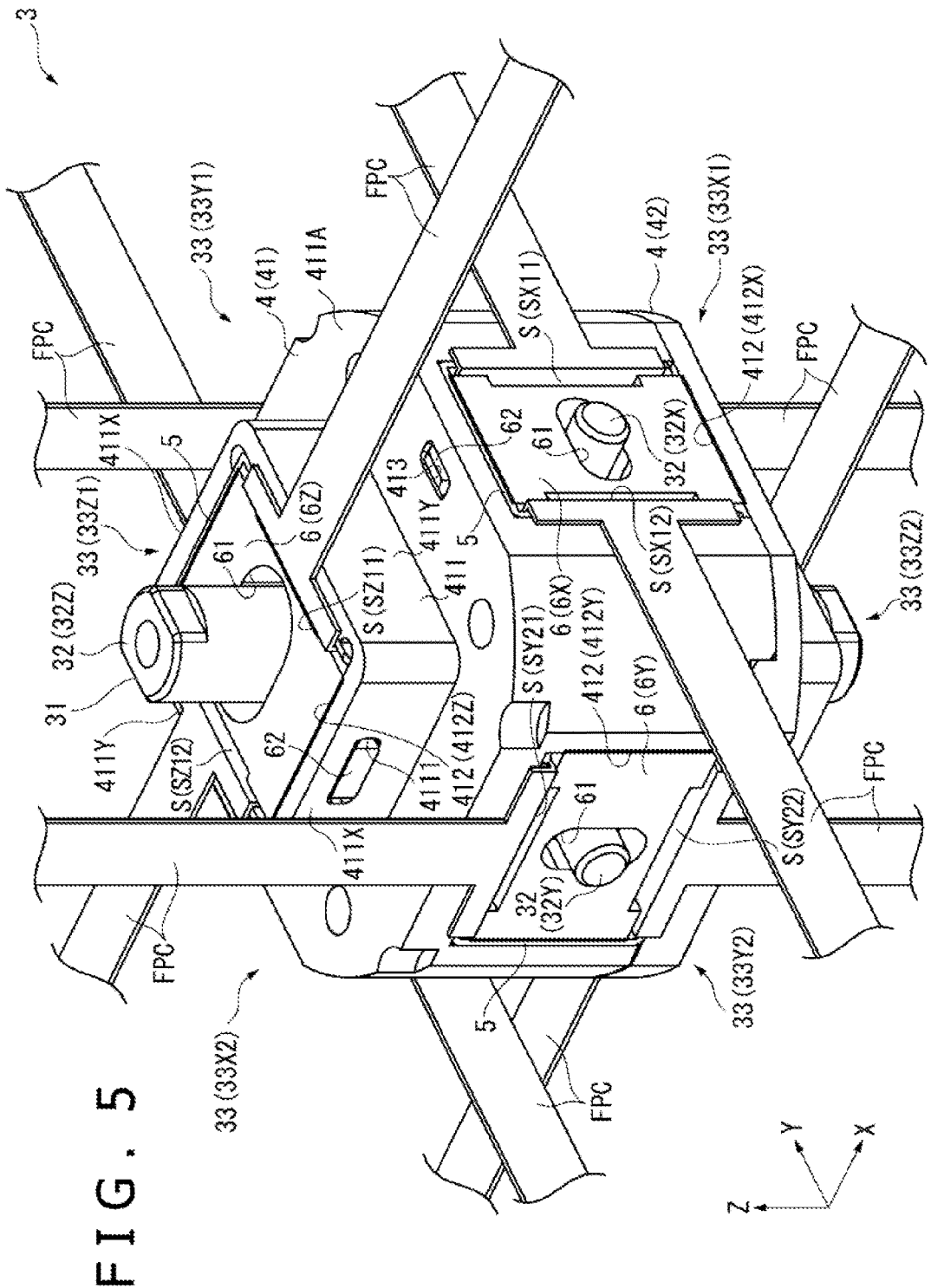
FIG. 5 is a perspective view depicting the manipulator with a third housing removed in the first embodiment.

FIG. 5 is a perspective view of the manipulator 3, from which the third housing 43 is removed, as viewed from the distal side in the Z direction and the distal side in the X direction.

The first housing 41 and the second housing 42 are formed in a substantially octagonal shape as viewed from the distal side in the Z direction. From between them, the first housing 41 has formed in the inside thereof a space in which the manipulation body 31 is accommodated.

Further, on the face 411A at the distal side of the first housing 41 in the Z direction, the attaching portion 411 which projects to the distal side in the Z direction is formed as depicted in FIG. 5. At the center of the attaching portion 411, a substantially rectangular opening 412 (412Z) is formed which extends through the first housing 41 along the Z direction. Further, at a position in the opening 412 corresponding to the attaching portion 411, the fifth detection body 33Z1 and a holding member 5 and position holding members 6 (6X, 6Y and 6Z) hereinafter described are located.

This attaching portion 411 has a pair of side face portions 411X along the X direction as viewed from the distal side in the Z direction and a pair of side face portions 411Y along the Y direction. From among the portions mentioned, each side face portion 411X has a hole portion 4111 formed therein. Projections 62 of the position holding member 6Z are inserted in the hole portions 4111 to fix the position holding member 6Z in the attaching portion 411.

It is to be noted that the dimension of the opening 412Z along the Y direction is greater than the dimension of the opening 412Z along the X direction. This is intended to locate the pressure-sensitive elements SZ11 and SZ12 of the fifth detection body 33Z1 individually along the YZ plane in the attaching portion 411.

Further, in the first housing 41, openings 412 (412X and 412Y) for communicating the aforementioned space (space in which the manipulation body 31 is accommodated) formed in the inside of the first housing 41 and the outside with each other are formed. In particular, in each of end faces at the distal side and the proximal side of the first housing 41 in the X direction, the opening 412X is formed. Further, the opening 412Y is formed in each of end faces of the first housing 41 at the distal side and the proximal side in the Y direction.

In the proximity of the end portion in the opening 412X at the distal side in the X direction from between the end portions, the first detection body 33X1, holding member 5 and position holding member 6 (6X) are located, and in the proximity of the end portion in the opening 412X at the proximal side in the X direction, the second detection body 33X2, holding member 5 and position holding member 6 (6X) are located. Such an opening 412X as just described is formed in a rectangular shape having a dimension in the Z direction greater than the dimension in the Y direction. This is intended to locate the pressure-sensitive elements SX11 and SX12 configuring the first detection body 33X1 and the pressure-sensitive elements SX21 and SX22 configuring the second detection body 33X2 along the XZ plane.

In the proximity of the end portion in the opening 412Y at the distal side in the Y direction, the third detection body 33Y1, holding member 5 and position holding member 6 (6Y) are disposed, and in the proximity in the opening 412Y at the distal side in the Y direction, the fourth detection body 33Y2, holding member 5 and position holding member 6 (6Y) are located. Such an opening 412Y as just described is formed in a rectangular shape having a dimension in the X direction greater than the dimension in the Z direction. This is intended to locate the pressure-sensitive elements SY11 and SY12 configuring the third detection body 33Y1 and the pressure-sensitive elements SY21 and SY22 configuring the fourth detection body 33Y2 along the XY plane. The opening 412X and the opening 412Y are open also to the proximal side in the Z direction. Further, the openings 412X and 412Y are closed with the second housing 42.

Further, in the face 411A of the first housing 41 at the distal side in the Z direction, a hole portion 413 in which a projection 62 of the position holding member 6X hereinafter described is inserted is formed.

The second housing 42 is attached at the proximal side of the first housing 41 in the Z direction and forms an end edge of the openings 412X and 412Y at the proximal side in the Z direction. At the center of the second housing 42, an attaching portion 421 of a substantially rectangular shape projecting to the proximal side in the Z direction is formed, and at the center of the attaching portion 421, an opening 422 extending through the second housing 42 along the Z direction is formed.

At a position in the opening 422 corresponding to the attaching portion 421, the sixth detection body 33Z2, holding member 5 and position holding member 6 (6Z) are located.

Similarly to the attaching portion 411, this attaching portion 421 has a pair of side faces 421X along the X direction as viewed from the proximal side in the Z direction and a pair of side faces 421Y along the Y direction. From among the side faces, each of the side faces 421X has a hole portion 4211 formed therein. Further, the projections 62 of the position holding member 6Z are inserted in the hole portions 4211 to fix the position holding member 6Z in the attaching portion 421.

It is to be noted that the dimension of the opening 422 along the Y direction is greater than the dimension of the opening 422 along the X direction. This is intended to locate the pressure-sensitive elements SZ21 and SZ22 of the sixth detection body 33Z2 individually along the YZ plane in the attaching portion 421.

Further, in the second housing 42, hole portions 423 are formed which extend through the second housing 42 in the Z direction. In the hole portions 423, projections 62 of the position holding member 6X provided corresponding to the first detection body 33X1 and the second detection body 33X2 are inserted.

[Configuration of the Holding Member]

Figure 6:
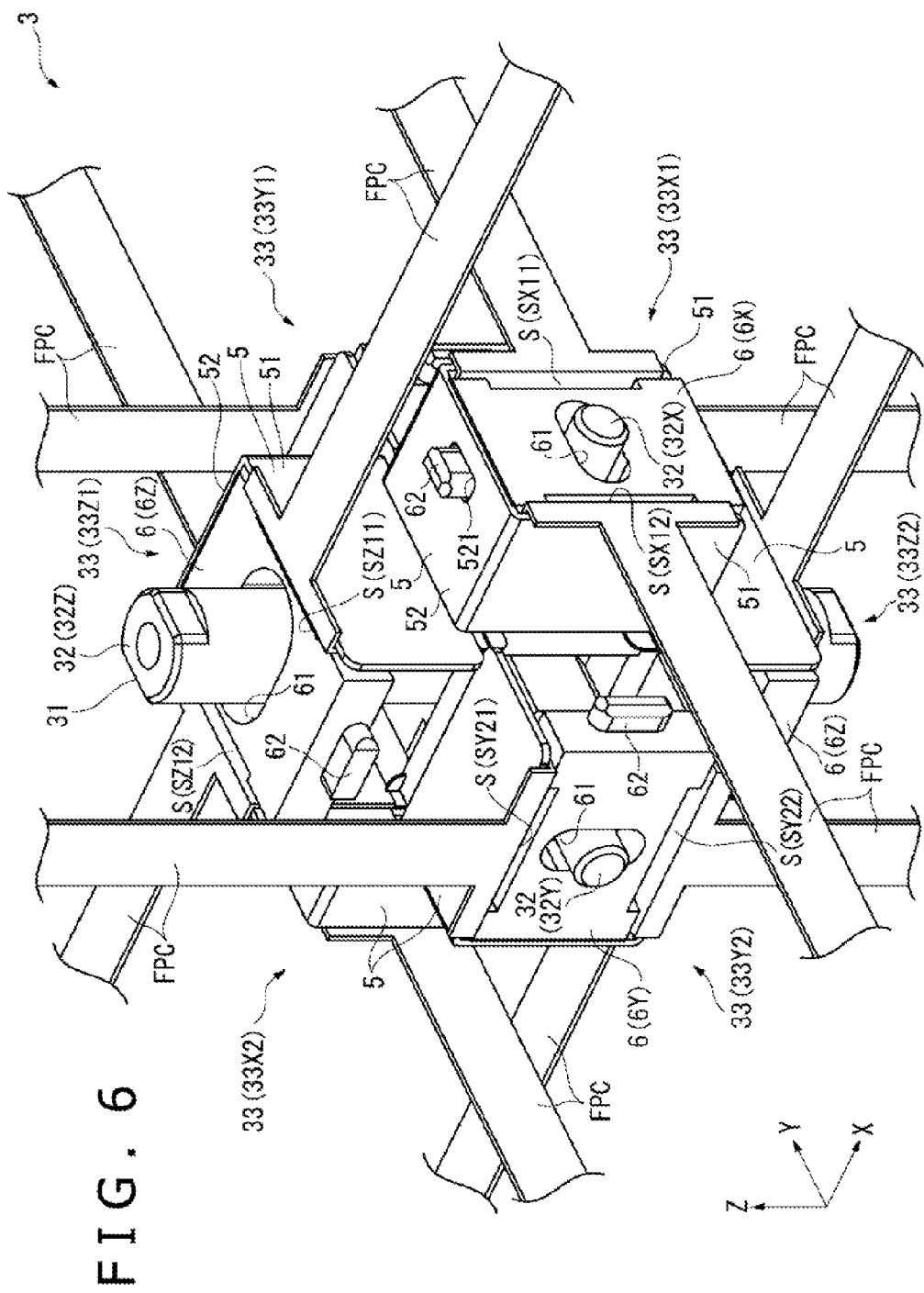
FIG. 6 is a perspective view depicting the manipulator with a housing removed in the first embodiment.

FIG. 6 is a perspective view where the manipulator 3 from which the housing 4 is removed is viewed from the distal side in the Z direction and the distal side in the X direction.

A holding member 5 is provided corresponding to each of the detection bodies 33. The holding members 5 are fixed in the openings 412 (412X, 412Y and 412Z) and opening 422 and hold the pressure-sensitive elements S which configure the detection bodies 33. The holding members 5 have a pair of side face portions 51 formed in a substantially U shape as viewed in cross section and opposing to each other, and a side face portion 52 which connects ends of the side face portions 51 to each other as shown in FIG. 6. Of the portions mentioned, the side face portion 52 has an elongated hole 521 formed therein in which the projection 62 of the position holding member 6 is inserted. Further, at the inner side of the holding members 5, the pressure-sensitive elements S of the corresponding detection bodies 33 are located along the side face portions 51 such that the detection faces SF thereof are opposed to each other.

[Configuration of the Position Holding Member]

The position holding members 6 (6X, 6Y, 6Z) are formed from an elastic body of rubber or the like and are provided each corresponding to the corresponding bar-shaped portion 32X and the detection body 33. These position holding members 6 have a function of keeping the manipulation body 31 at a position in the housing 4. In particular, each position holding member 6 exerts biasing force for returning, after displacement of the manipulation body 31, the manipulation body 31 to an initial position to act upon the manipulation body 31. Therefore, the position holding member 6 corresponds to the biasing member in the present invention.

From among the members described, the position holding members 6X are provided in the proximity of end portions of the bar-shaped portion 32X at the distal side and the proximal side in the X direction across the aforementioned intersection point P (refer to FIG. 2). Meanwhile, the position holding members 6Y are provided in the proximity of end portions of the bar-shaped portion 32Y at the distal side and the proximal side in the Y direction across the intersection point P. Further, the position holding members 6Z are provided in the proximity of end portions of the bar-shaped portion 32Z at the distal side and the proximal side in the Z direction across the intersection point P.

Such a position holding member 6 as described above is disposed in the holding member 5 provided corresponding to the respective corresponding detection body 33 between a pair of the pressure-sensitive elements S which configure the detection body 33. These position holding members 6 are formed in a substantially H shape cut away substantially centrally at a pair of long side portions of a substantially rectangular shape as viewed in plan as depicted in FIG. 6. Further, at the center of the position holding members 6X, 6Y and 6Z, a hole portion 61 of an elongated circular shape along the lateral direction is formed. This hole portion 61 is formed in accordance with the outer diameter of the corresponding bar-shaped portion 32, and the corresponding bar-shaped portion 32 is inserted in the hole portion 61.

It is to be noted that the dimension of the outer diameter of a portion of the bar-shaped portion 32Z inserted in the hole portion 61 is greater than the dimension of the outer diameter of portions of the bar-shaped portions 32X and 32Y inserted in the hole portions 61. Further, the outer diameter dimension of the bar-shaped portion 32X and the outer diameter dimension of the bar-shaped portion 32Y are equal to each other. Therefore, the inner diameter (minor diameter) of the hole portion 61 formed in the position holding member 6Z is greater than the inner diameter (minor diameter) of the hole portions 61 formed in the position holding members 6X and 6Y. Further, the inner diameters (minor diameters and major diameters) of the hole portions 61 formed in the position holding members 6X and 6Y are equal to each other.

These position holding members 6X, 6Y and 6Z are located such that the dimensions of the major diameters of the hole portions 61 intersects orthogonally with the detection faces SF (refer to FIG. 8) of the pressure-sensitive elements S sandwiched between the position holding members 6X, 6Y and 6Z and the holding members 5. In particular, the major diameter direction of the hole portion 61 in each position holding member 6X extends along the Y direction. Meanwhile, the major diameter direction of the hole portion 61 in each position holding member 6Y extends along the Z direction. Further, the major diameter direction of the hole portion 61 in the position holding member 6Z extends along the X direction. In other words, end edges of the position holding members 6X intersecting with the minor diameter direction (Z direction) of the hole portions 61 sandwich the bar-shaped portion 32X therebetween. End edges of the position holding members 6Y in the minor diameter direction (X direction) of the hole portions 61 sandwich the bar-shaped portion 32Y therebetween. Further, end edges of the position holding members 6Z in the minor diameter direction (Y direction) of the hole portions sandwich the bar-shaped portion 32Z therebetween. In this manner, the location directions of the position holding members 6 (6X, 6Y, 6Z) are different from each other.

An initial position of the bar-shaped portion 32X in the Z direction is set by the end edges of the position holding members 6X located in such a manner as described above which intersect with the Z direction of the hole portions 61. Further, an initial position of the bar-shaped portion 32Y in the X direction is set by the end edges of the position holding members 6Y intersecting with the X direction of the hole portions 61. Further, an initial position of the bar-shaped portion 32Z in the Y direction is set by the end edges of the position holding members 6Z intersecting with the Y direction of the hole portions 61.

Accordingly, the initial positions of the manipulation body 31 in the X direction, Y direction and Z direction are set by the paired position holding members 6X, paired position holding members 6Y and paired position holding members 6Z.

It is to be noted that, while the hole portions 61 have, in the present embodiment, an elongated circular shape, they may otherwise have a true circular shape.

However, if the shape of each hole portion 61 is set to a true circular shape, then the bar-shaped portion 32 is brought into abutment with an end edge of the hole portion 61 by a small displacement amount of the manipulation body 31. For example, when the manipulation body 31 is pivoted to the distal side in the X direction around the pivot axis along the Y direction, the bar-shaped portions 32X and 32Z are brought into abutment with end edges of the hole portions 61 by a small displacement amount. In such a case, it becomes less easy to displace the manipulation body 31, and a manipulation feeling of the manipulation body 31 cannot be obtained readily. This similarly applies also to a case in which the manipulation body 31 is displaced to a different direction.

In contrast, in the present embodiment, each hole portion 61 is formed in an elongated circular shape. Therefore, while, in the former case, the bar-shaped portion 32X is abutted with an end edge of the hole portion 61 by a small displacement amount, the bar-shaped portion 32Z is not abutted with an end edge of the hole portion 61 by a small displacement amount. Consequently, the resistance upon displacement of the manipulation body 31 can be reduced and the manipulation body 31 can be displaced readily, and therefore, a manipulation feeling of the manipulation body 31 can be obtained readily. This similarly applies also to a case in which the manipulation body 31 is displaced in a different direction.

On end faces of the position holding members 6X, 6Y and 6Z at the opposite end sides in the long-side direction, projections 62 which project in out-of-plane directions (namely, in directions away from each other) are formed. Further, the projections 62 of the position holding member 6Z provided corresponding to the fifth detection body 33Z1 are inserted in the hole portions 4111. Further, the projections 62 of the position holding member 6Z provided corresponding to the sixth detection body 33Z2 are inserted in the hole portions 4211. Consequently, the position holding members 6Z are respectively fixed to the first housing 41 and the second housing 42.

On the other hand, one of the projections 62 of each position holding member 6 is inserted in the hole portion 413 while the other is inserted in the hole portion 423. Consequently, each position holding member 6X is fixed to the first housing 41 and the second housing 42. It is to be noted that the projections 62 of each position holding member 6Y are fitted from the proximal side in the Z direction into grooved portions (not shown) formed along the Z direction on inner faces of the openings 412Y of the first housing 41. Consequently, the position holding members 6Y are fixed to the first housing 41.

[Configuration of the Manipulation Body]

Figure 7:
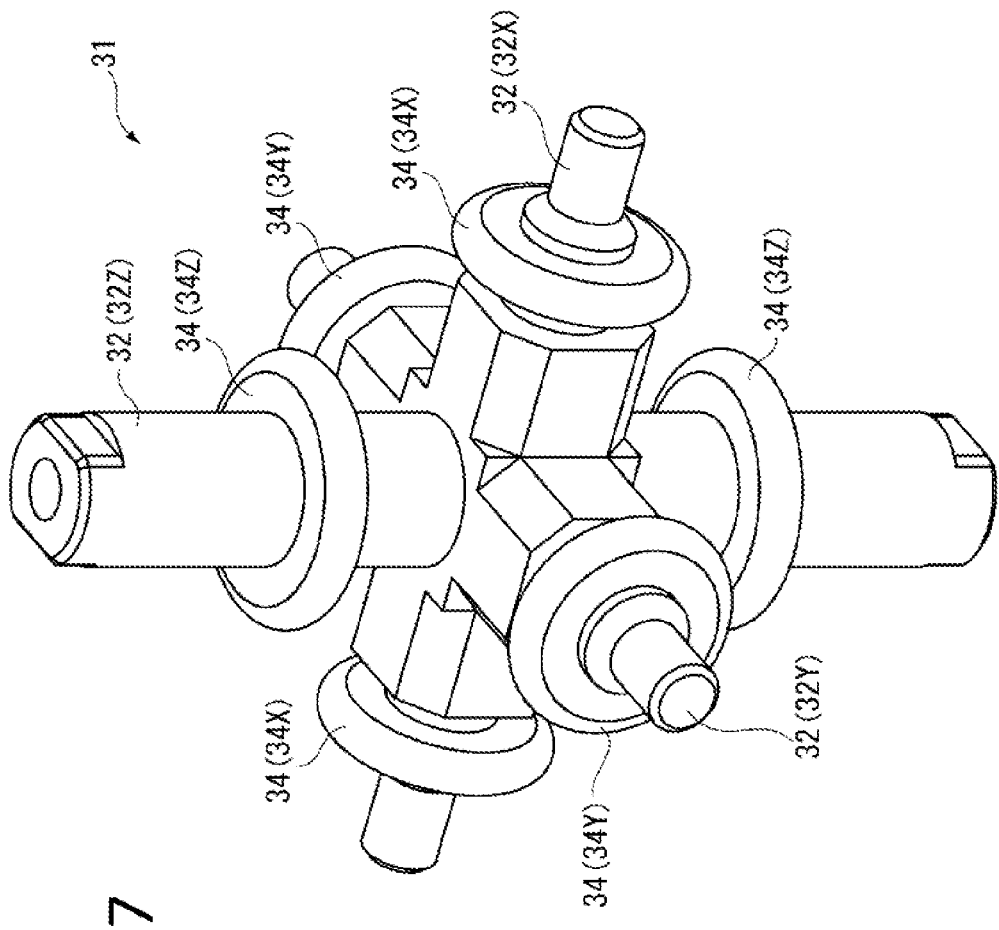
FIG. 7 is a perspective view depicting the manipulator in the first embodiment.

FIG. 7 is a perspective view depicting the manipulation body 31.

Here, details of the manipulation body 31 are described. The manipulation body 31 has three bar-shaped portions 32X, 32Y and 32Z as described hereinabove, and the center axes of the bar-shaped portions 32X, 32Y and 32Z intersect orthogonally with each other at the intersection point P (refer to FIG. 2) positioned at the center. The bar-shaped portions 32X and 32Y from among them have a central portion formed in a shape of a substantially octagonal prism and have a cylindrical shape at the opposite ends thereof. Meanwhile, the bar-shaped portion 32Z is formed in a substantially cylindrical shape on the whole. Further, the dimension of the bar-shaped portion 32Z along the Z direction is greater than the dimension of the bar-shaped portion 32X along the X direction and the dimension of the bar-shaped portion 32Y along the Y direction, and the outer diameter dimension of the bar-shaped portion 32Z is greater than the outer diameter dimensions of the opposite end portions of the bar-shaped portions 32 and 32Y. This is because, since the bar-shaped portion 32Z has caps 316 (refer to FIG. 1) attached to the opposite ends thereof and held between and by fingers of and operated by the user, it is intended to assure the rigidity of the bar-shaped portion 32Z. In other words, the bar-shaped portion 32 directly operated by (held between) fingers of the user are different in rigidity from the two other bar-shaped portions 32 orthogonal to this bar-shaped portion 32.

It is to be noted that the dimension of the bar-shaped portion 32X in the X direction and the dimension of the bar-shaped portion 32Y along the bar-shaped portion 32Y are substantially equal to each other, and the outer diameter dimension of the opposite ends of the bar-shaped portion 32X and the outer diameter dimension of the opposite ends of the bar-shaped portion 32Y are substantially equal to each other.

In the proximity of the opposite ends of these bar-shaped portions 32X, 32Y and 32Z, annular elastic bodies 34 (34X, 34Y, 34Z) are mounted, respectively. In particular, the elastic bodies 34X are provided at one end side (distal side in the X direction) and the other end side (proximal side in the X direction) of the bar-shaped portion 32X in a direction along the center axis of the bar-shaped portion 32X across the aforementioned intersection point P (refer to FIG. 2). The distances between these elastic bodies 34X and the intersection point P are equal to each other. It is to be noted that also the elastic bodies 34Y provided in the proximity of the opposite ends of the bar-shaped portion 32Y in the Y direction and the elastic bodies 34Z provided in the proximity of the opposite ends of the bar-shaped portion 32Z in the Z direction are configured similarly.

These elastic bodies 34 (34X, 34Y, 34Z) are configured from an elastic material such as rubber and press the pressure-sensitive elements S of the detection bodies 33 when the manipulation body 31 is operated. Since such elastic bodies 34 as just described are provided, it is possible to displace the manipulation body 31 easily in comparison with an alternative case in which the manipulation body 31 directly presses the pressure-sensitive elements S. Accordingly, the operability of the manipulation body 31 can be improved and a manipulation feeling can be improved.

Such elastic bodies 34 as described above have an outer diameter dimension in accordance with the distance between the detection faces SF of the paired pressure-sensitive elements S sandwiching the elastic bodies 34 therebetween. The distances between the detection faces SF in the present embodiment are equal among the detection bodies 33, and therefore, the outer diameter dimensions of the elastic bodies 34 are equal to each other. Further, the elastic bodies 34X and 34Y and the elastic bodies 34Z have a same configuration except that the dimensions of the hole portions in which the corresponding bar-shaped portions 32X, 32Y and 32Z are inserted are different from each other.

It is to be noted that, where it is desired to change the operation feeling of the manipulator 3 in response to the direction of displacement of the manipulation body 31, the hardness may be changed among the elastic bodies 34X, 34Y and 34Z. For example, in order to make it possible to carry out translational movement of the manipulation body 31 in the Z direction by a light manipulation feeling, the hardness of the elastic bodies 34Y sandwiched between the detection faces SF of the third detection body 33Y1 and the fourth detection body 33Y2 for detecting a displacement in the Z direction may be set lower than the hardness of the other elastic bodies 34X and 34Z. Further, the distances between the elastic bodies 34 and the paired detection faces SF opposing to the elastic bodies 34 may be made different from each other. This makes it possible to adjust the margin (namely, the allowance) until the displacement of the manipulation body 31 is detected for each displacement direction.

[Positional Relationship Between the Detection Member and the Elastic Body]

Figure 8:
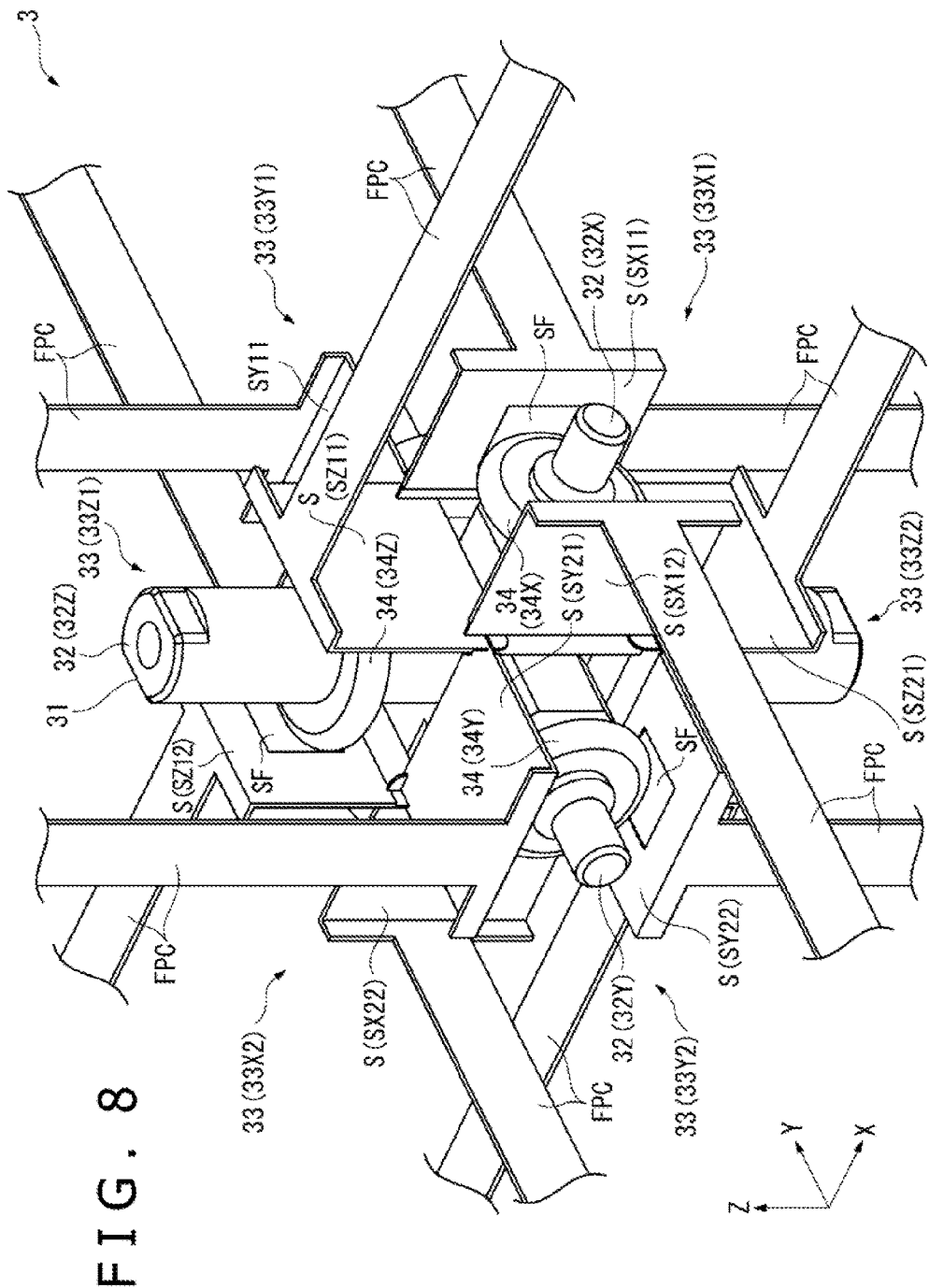
FIG. 8 is a perspective view illustrating a positional relationship between an elastic body and a detection face in the first embodiment.
Figure 9:
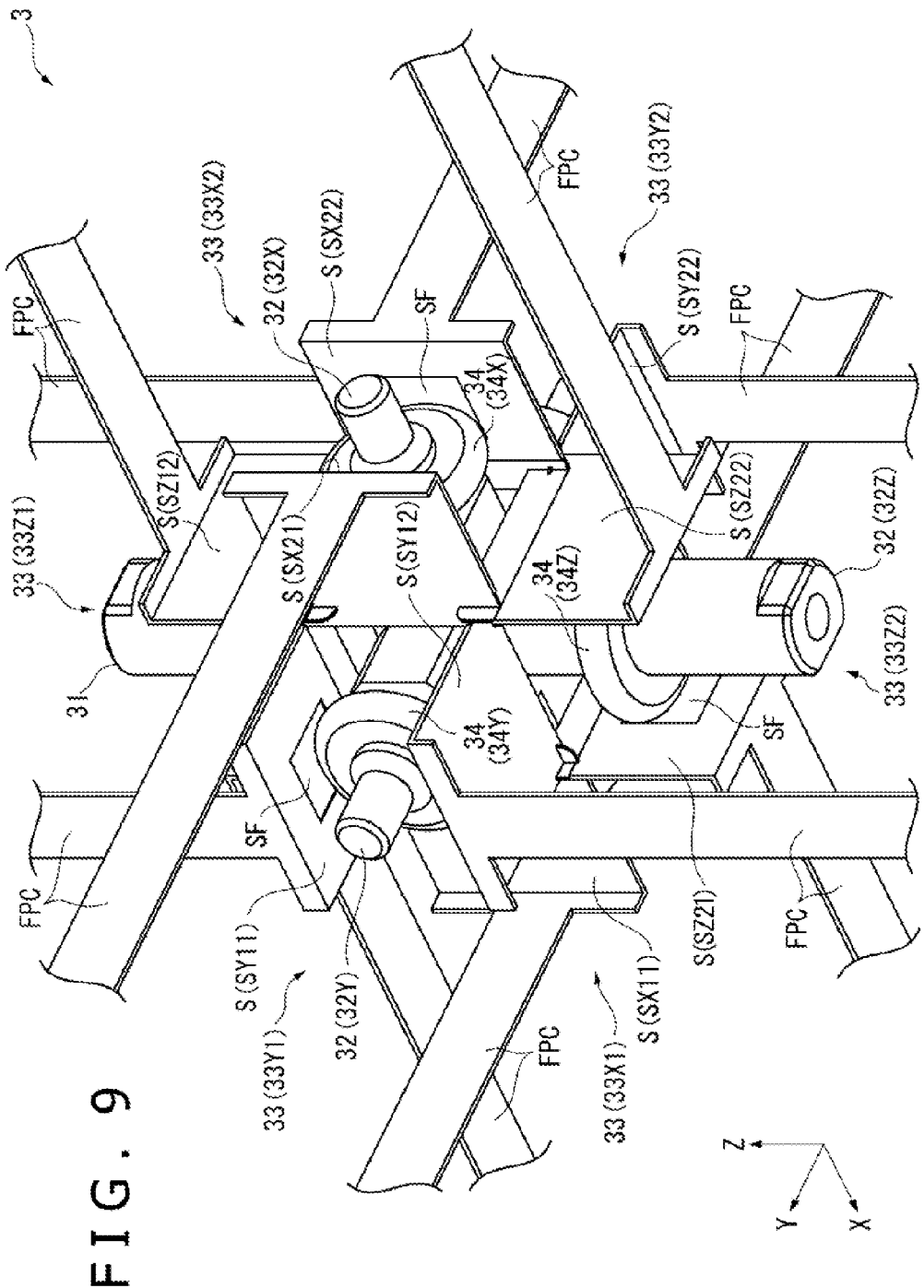
FIG. 9 is a perspective view illustrating a positional relationship between the elastic body and the detection face in the first embodiment.

FIGS. 8 and 9 are perspective views illustrating a positional relationship between the elastic bodies 34 provided on the bar-shaped portions 32 of the manipulation body 31 and the detection faces SF of the pressure-sensitive elements S. In other words, FIG. 8 is a perspective view when the manipulator 3 from which the housing 4, the holding members 5 and the position holding members 6 are removed is viewed from the distal side in the Z direction and the distal side in the X direction, and FIG. 9 is a perspective view when the manipulator 3 is viewed from the proximal side in the Z direction and the proximal side in the X direction.

As described hereinabove, the detection bodies 33 (33X1, 33X2, 33Y1, 33Y2, 33Z1, 33Z2) are configured individually including the pair of the pressure-sensitive elements S between which the corresponding bar-shaped portion 32X is sandwiched. Describing particularly, the pair of the pressure-sensitive elements S are disposed in such a manner as to sandwich the elastic member 34 provided on the corresponding bar-shaped portion 32X therebetween.

In particular, the first detection body 33X1 has the pair of the pressure-sensitive elements SX11 and SX12 which sandwich the bar-shaped portion 32X therebetween as depicted in FIG. 8. These pressure-sensitive elements SX11 and SX12 are located such that the detection faces SF thereof pressed by the bar-shaped portion 32X with the elastic body 34X interposed therebetween are opposed to each other. Similarly, the second detection body 33X2 has the pair of the pressure-sensitive elements SX21 and SX22 which sandwich the bar-shaped portion 32X therebetween as depicted in FIG. 9. These pressure-sensitive elements SX21 and SX22 are located such that the detection faces SF thereof pressed by the bar-shaped portion 32X with the elastic body 34X interposed therebetween are opposed to each other.

The detection faces SF of the pressure-sensitive elements SX11, SX12, SX21 and SX22 are located along the XZ plane with gaps of an equal dimension left from the elastic body 34X.

The third detection body 33Y1 has the pair of the pressure-sensitive elements SY11 and SY12 which sandwich the bar-shaped portion 32Y therebetween as depicted in FIG. 9. The paired pressure-sensitive elements SY11 and SY12 are located such that the detection faces SF pressed by the bar-shaped portion 32Y with the elastic body 34Y interposed therebetween are opposed to each other.

Similarly, the fourth detection body 33Y2 has the pair of the pressure-sensitive elements SY21 and SY22 which sandwich the bar-shaped portion 32Y therebetween as depicted in FIG. 8. The paired pressure-sensitive elements SY21 and SY22 are located such that the detection faces SF thereof pressed by the bar-shaped portion 32Y with the elastic body 34Y interposed therebetween are opposed to each other.

The detection faces SF of the pressure-sensitive elements SY11, SY12, SY21 and SY22 are located along the XY plane with gaps of an equal dimension left from the elastic body 34Y.

The fifth detection body 33Z1 has the pair of the pressure-sensitive elements SZ11 and SZ12 which sandwich the bar-shaped portion 32X therebetween as depicted in FIG. 8. The paired pressure-sensitive elements SZ11 and SZ12 are located such that the detection faces SF thereof pressed by the bar-shaped portion 32Z with the elastic body 34Z interposed therebetween are opposed to each other. Similarly, the sixth detection body 33Z2 has the pair of the pressure-sensitive elements SZ21 and SZ22 which sandwich the bar-shaped portion 32Z therebetween as depicted in FIG. 9. The paired pressure-sensitive elements SZ21 and SZ22 are located such that the detection faces SF thereof pressed by the bar-shaped portion 32Z with the elastic body 34Z interposed therebetween are opposed to each other.

The detection faces SF of the pressure-sensitive elements SZ11, SZ12, SZ21 and SZ22 are located along the YZ plane with gaps of an equal dimension left from the elastic bodies 34Z.

Thus, the detection bodies 33 detect translational movements of the manipulation body 31 along the XY plane, XZ plane and YZ plane and pivotal movement of the manipulation body 31 around the axes of pivotal movement along the XY plane, XZ plane and YZ plane as described hereinabove.

Figure 10:
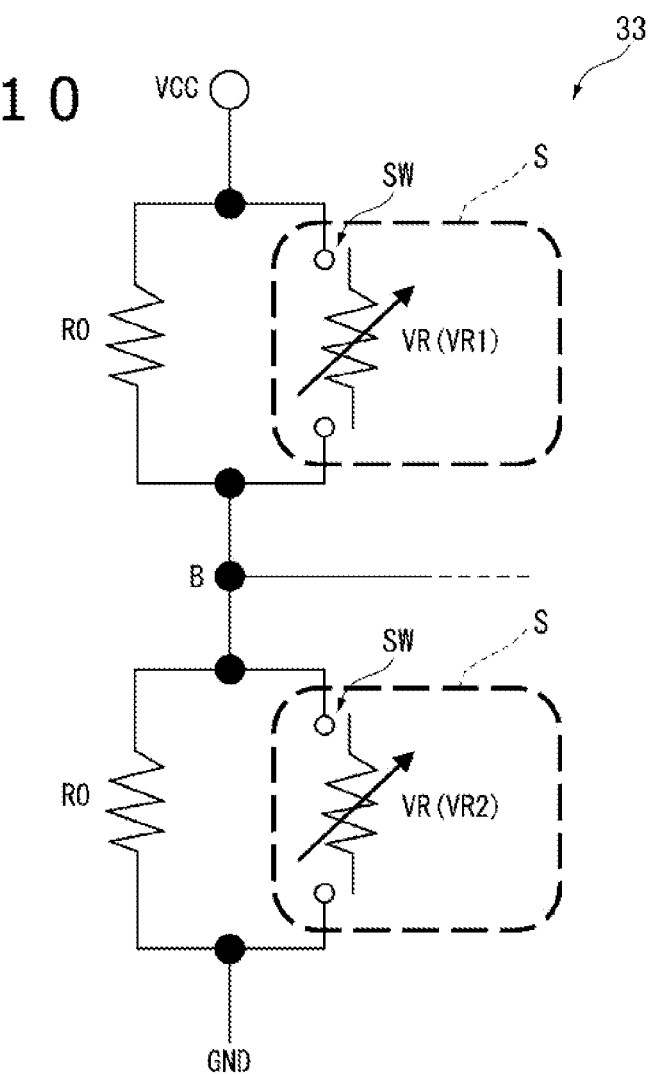
FIG. 10 is a view depicting a circuit configuration of a detection body in the first embodiment.

FIG. 10 is a view depicting a circuit configuration of the detection body 33. It is to be noted that, in FIG. 10, a circuit configuration of the first detection body 33X1 is depicted as an example of the detection body 33. Here, a configuration of the detection body 33 is described.

The detection body 33 has, in addition to the pair of the pressure-sensitive elements S which are pressure-sensitive resistance elements, a fixed resistor R0 connected in parallel to each of the pressure-sensitive elements S as shown in FIG. 10.

In particular, the detection body 33 is connected at one end thereof to a power supply apparatus provided in the manipulation apparatus 1 and at the other end thereof to the ground (GND). Between them, one of the fixed resistors R0 and one of the pressure-sensitive elements S are connected in parallel, and the other fixed resistor R0 and the other pressure-sensitive element S are connected in parallel through a branch B. The branch B is connected to a control apparatus (not depicted) provided in the manipulation apparatus 1. It is to be noted that the resistance values of the fixed resistors R0 are equal to each other.

In such a detection body 33 as described above, when the detection face SF of each pressure-sensitive element S is not pressed, a variable resistor VR1 of the pressure-sensitive element S and a switch SW are in a disconnected state. Therefore, if a voltage of a predetermined value is applied from the power supply apparatus, then a voltage (reference voltage) divided by the fixed resistors R0 of the equal resistance value is outputted to the control apparatus through the branch B.

On the other hand, if the manipulation body 31 is operated and a detection face SF is pressed, then the variable resistor VR (VR1, VR2) of the pressure-sensitive element S having the detection face SF and the switch SW conduct. Consequently, a voltage increased or decreased in response to the pressing force is outputted to the control apparatus through the branch B.

Then, the control apparatus decides whether or not the inputted voltage (input voltage) is equal to the reference voltage to decide whether or not the detection body 33 which outputs the input voltage is pressed by the manipulation body 31 (in other words, whether or not a displacement of the manipulation body 31 is detected). Then, if the input voltage is the reference voltage, then the control apparatus decides that the manipulation body 31 is not operated. On the other hand, if it is decided that the input voltage is not the reference voltage, then the control apparatus decides whether the input voltage is higher or lower than the reference voltage. The control apparatus thereby decides which one of the pressure-sensitive elements S is pressed by the manipulation body 31. Further, the control apparatus arithmetically operates the pressure acting upon the detection face SF based on the voltage value of the input voltage and calculates the stress applied to the manipulation body 31 by the user based on the arithmetically operated pressure.

By such a configuration as just described, the number of signal lines connected from the detection bodies 33 to the control apparatus can be set to a number corresponding to the detection bodies 33. Thus, the number of signal lines can be reduced in comparison with that in an alternative case in which the pressure-sensitive elements S and the control apparatus are individually connected to each other.

With the manipulation apparatus 1 according to the present embodiment described above, the following effects are achieved.

The detection faces SF of the pressure-sensitive elements SX11 and SX12 are disposed along the XZ plane. Therefore, a translational movement of the manipulation body 31 along the Y direction can be detected by the first detection body 33X1.

Further, the detection faces SF of the pressure-sensitive elements SX21 and SX22 extend in parallel to the detection faces SF of the pressure-sensitive elements SX11 and SX12. Therefore, a translational movement of the manipulation body 31 along the Y direction can be detected also by the second detection body 33X2. Further, by the first detection body 33X1 and the second detection body 33X2, a pivotal movement of the manipulation body 31 around the axis of pivotal movement along the Z direction can be detected.

Furthermore, the pressure-sensitive elements SY11 and SY12 are located along the XY plane. Therefore, a translational movement of the manipulation body 31 along the Z direction can be detected by the third detection body 33Y1.

With such a manipulator 3 as described above, the number of displacement directions of the manipulation body 31 which can be detected can be increased in comparison with an analog stick of two orthogonal axes. This similarly applies also to the other detection bodies 33.

In addition to the first detection body 33X1, the second detection body 33X2 and the third detection body 33Y1, the fourth detection body 33Y2 whose detection faces SF extend in parallel to the detection faces SF of the third detection body 33Y1 is provided. Therefore, a pivotal movement of the manipulation body 31 around the axis of pivotal movement along the X direction can be detected by the third detection body 33Y1 and the fourth detection body 33Y2.

Accordingly, the number of displacement directions of the manipulation body 31 which can be detected can be increased further.

The detection faces SF of the pressure-sensitive elements SZ11 and SZ12 are located along the YZ plane. Therefore, a translational movement of the manipulation body 31 in the X direction can be detected by the fifth detection body 33Z1. Further, the detection faces SF of the pressure-sensitive elements SZ21 and SZ22 extend in parallel to the detection faces SF of the pressure-sensitive elements SZ11 and SZ12. Therefore, a translational movement of the manipulation body 31 along the X direction can be detected also by the sixth detection body 33Z2. Further, a pivotal movement of the manipulation body 31 around the axis of pivotal movement along the Y direction can be detected by the fifth detection body 33Z1 and the sixth detection body 33Z2. Accordingly, the number of displacement directions of the manipulation body 31 which can be detected can be increased further.

In the present embodiment, the detection body 33 is configured including the paired pressure-sensitive elements S. Therefore, in comparison with an alternative case in which a strain gauge is adopted, the manipulator 3 can be configured at a low cost. Furthermore, processing of the control apparatus of the manipulation apparatus 1 which decides the displacement direction of the manipulator 3 based on a signal outputted from the detection body 33 can be simplified.

The detection faces SF of the first detection body 33X1 and the detection faces SF of the second detection body 33X2 extend in parallel to each other, and the detection faces SF extend along the XZ plane. Further, the detection faces SF of the third detection body 33Y1 and the detection faces SF of the fourth detection body 33Y2 extend in parallel to each other, and the detection faces SF extend along the XY plane. Furthermore, the detection faces SF of the fifth detection body 33Z1 and the detection faces SF of the sixth detection body 33Z2 extend in parallel to each other, and the detection faces SF extend along the YZ plane. In particular, the detection faces SF of the first detection body 33X1 and the second detection body 33X2, the detection faces SF of the third detection body 33Y1 and the fourth detection body 33Y2 and the detection faces SF of the fifth detection body 33Z1 and the sixth detection body 33Z2 intersect orthogonally with each other.

From this, the translational movement along the Y direction and the pivotal movement around the axis of pivotal movement along the Z direction from among the displacements of the manipulation body 31 can be detected with certainty by the detection bodies 33X1 and 33X2. Further, the translational movement along the Z direction and the pivotal movement around the axis of pivotal movement along the X direction from among the displacements of the manipulation body 31 can be detected with certainty by the detection bodies 33Y1 and 33Y2. Furthermore, the translational movement along the X direction and the pivotal movement around the axis of pivotal movement along the Y direction from among the displacements of the manipulation body 31 can be detected with certainty by the detection bodies 33Z1 and 33Z2. Accordingly, the displacements of the six axes of the manipulation body 31 can be detected with certainty.

Regarding the paired pressure-sensitive elements SX11 and SX12 sandwiching the bar-shaped portion 32X, the gap between the detection face SF of the pressure-sensitive element SX11 and the bar-shaped portion 32X is equal in dimension to the gap between the detection face SF of the pressure-sensitive element SX12 and the bar-shaped portion 32X. With the configuration just described, the displacement amounts of the manipulation body 31 when the pressure-sensitive elements SX11 and SX12 detect pressure can be set to an equal displacement amount between a case in which the displacement amount is detected by the pressure-sensitive element SX11 and in another case in which the displacement amount is detected by the pressure-sensitive element SX12. Consequently, the pressures to be detected by the pressure-sensitive elements SX11 and SX12 can be made equal to each other when the displacement amounts are equal. Accordingly, the displacement direction of the manipulation body 31 can be detected with a higher degree of accuracy. It is to be noted that this similarly applies also to the other paired pressure-sensitive elements S.

Between a pair of the pressure-sensitive elements S, an elastic member 34 (34X, 34Y, 34Z) as a biasing member for exerting biasing force for positioning the corresponding bar-shaped portion 32 intermediately is provided. With this configuration, in a state in which the manipulation apparatus 1 is not operated by the user, each bar-shaped portion 32 can be positioned between a corresponding pair of the pressure-sensitive elements S by the biasing force (elastic force) of the elastic member 34. Accordingly, the manipulation body 31 can be returned to an initial position (position when the manipulation apparatus 1 is not operated), and the operability of the manipulator 2 and hence of the manipulation apparatus 1 can be improved.

When the detection faces SF are not pressed, the detection body 33 outputs the reference voltage, but if one of the detection faces SF of the pressure-sensitive elements S is pressed, then the detection body 33 outputs a voltage (first voltage) lowered from the reference voltage in response to the pressing force. However, if the other one of the detection faces SF is pressed, then the detection body 33 outputs a voltage (second voltage) raised from the reference voltage in response to the pressing force.

With the configuration just described, which one of the paired pressure-sensitive elements S which the detection body 33 has is pressed can be decided from the voltage outputted from the detection body 33. Accordingly, in comparison with an alternative case in which the pressure-sensitive elements S and the control apparatus are connected to each other, the number of signal lines can be reduced, and signal processing by the control apparatus can be simplified.

First Modification to the First Embodiment

In the manipulator 3 described hereinabove, the detection faces SF of the first detection body 33X1 and the second detection body 33X2 extend along the XZ plane. Further, the detection faces SF of the third detection body 33Y1 and the fourth detection body 33Y2 extend long the XY plane. Furthermore, the detection faces SF of the fifth detection body 33Z1 and the sixth detection body 33Z2 extend along the YZ plane. However, if two sets of a pair of the detection faces SF are provided for the corresponding bar-shaped portion 32 and the detection faces SF of the paired pressure-sensitive elements S are disposed such that they are directed to the corresponding bar-shaped portion 32X and sandwich the bar-shaped portion 32X therebetween, then the relationship between the bar-shaped portion 32X and the detection faces SF of the pair of the pressure-sensitive elements S is not limited to the location described above.

Figure 11:
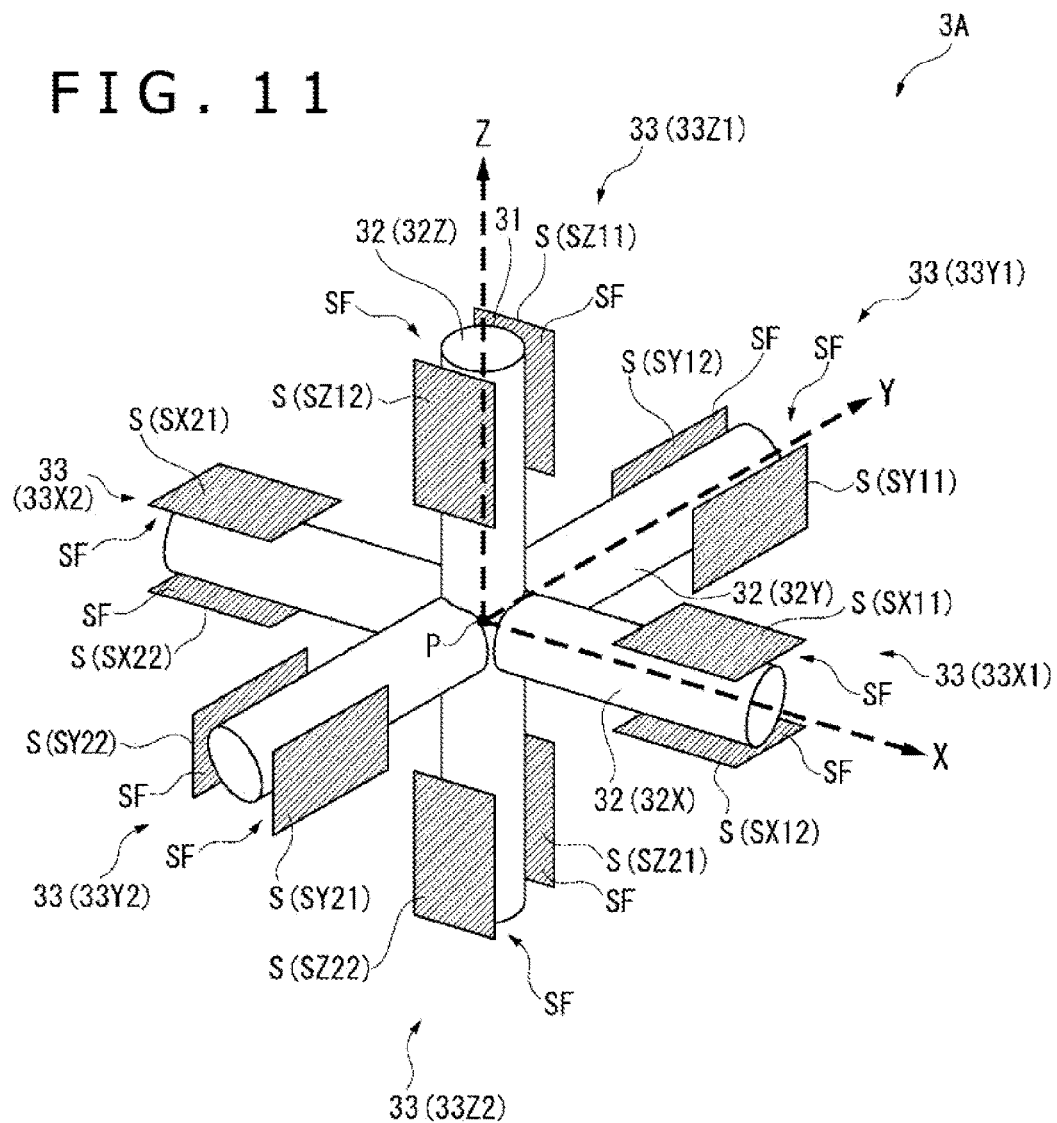
FIG. 11 is a view illustrating a modification to the manipulator in the first embodiment.

FIG. 11 is a view depicting a general configuration of a manipulator 3A which is a modification to the manipulator 3.

The manipulator 3A which is a modification to the manipulator 3 has a configuration and functions similar to those of the manipulator 3 except that the location of a pair of pressure-sensitive elements S which configure each detection body 33 is different from that in the manipulator 3.

In the manipulator 3A, the detection faces SF of the pressure-sensitive elements SX11 and SX12 of the first detection body 33X1 and the detection faces SF of the pressure-sensitive elements SX21 and SX22 of the second detection body 33X2 are located such that they extend along the XY plane and sandwich the bar-shaped portion 32X therebetween such that the above-described gaps are left therebetween.

Further, the detection faces SF of the pressure-sensitive elements SY11 and SY12 of the third detection body 33Y1 and the detection faces SF of the pressure-sensitive elements SY21 and SY22 of the fourth detection body 33Y2 are located such that they extend along the YZ plane and sandwich the bar-shaped portion 32Y therebetween such that the above-described gaps are left therebetween. Furthermore, the detection faces SF of the pressure-sensitive elements SZ11 and SZ12 of the fifth detection body 33Z1 and the detection faces SF of the pressure-sensitive elements SZ21 and SZ22 of the sixth detection body 33Z2 are located such that they extend along the XZ plane and sandwich the bar-shaped portion 32Z therebetween such that the above-described gaps are left therebetween.

In such a manipulator 3A as described above, the translational movement along the Z direction and the pivotal movement around the axis of pivotal movement along the Y direction from among the displacements of the manipulation body 31 can be detected by the first detection body 33X1 and the second detection body 33X2. Further, the translational movement along the X direction and the pivotal movement around the axis of pivotal movement along the Z direction from among the displacements of the manipulation body 31 can be detected by the third detection body 33Y1 and the fourth detection body 33Y2.

Furthermore, the translational movement along the Y direction and the pivotal movement around the axis of pivotal movement along the X direction from among the displacements of the manipulation body 31 can be detected by the fifth detection body 33Z1 and the sixth detection body 33Z2.

Accordingly, also with the manipulation apparatus having the manipulator 3A can achieve effects similar to those achieved by the manipulation apparatus 1 described hereinabove.

Second Modification to the First Embodiment

In the manipulation apparatus 1 described above, the first detection body 33X1 and the second detection body 33X2 are located such that the detection faces SF thereof extend in parallel to each other along the XZ plane. Further, the third detection body 33Y1 and the fourth detection body 33Y2 are located such that the detection faces SF thereof extend in parallel to each other along the XY plane. Furthermore, the fifth detection body 33Z1 and the sixth detection body 33Z2 are located such that the detection faces SF thereof extend in parallel to each other along the YZ plane. However, the pressure-sensitive elements S may be located such that the detection faces SF which the first detection body 33X1 has and the detection faces SF which the second detection body 33X2 has intersect orthogonally with each other. This similarly applies also to the third detection body 33Y1 and the fourth detection body 33Y2 and to the fifth detection body 33Z1 and the sixth detection body 33Z2.

Figure 12:
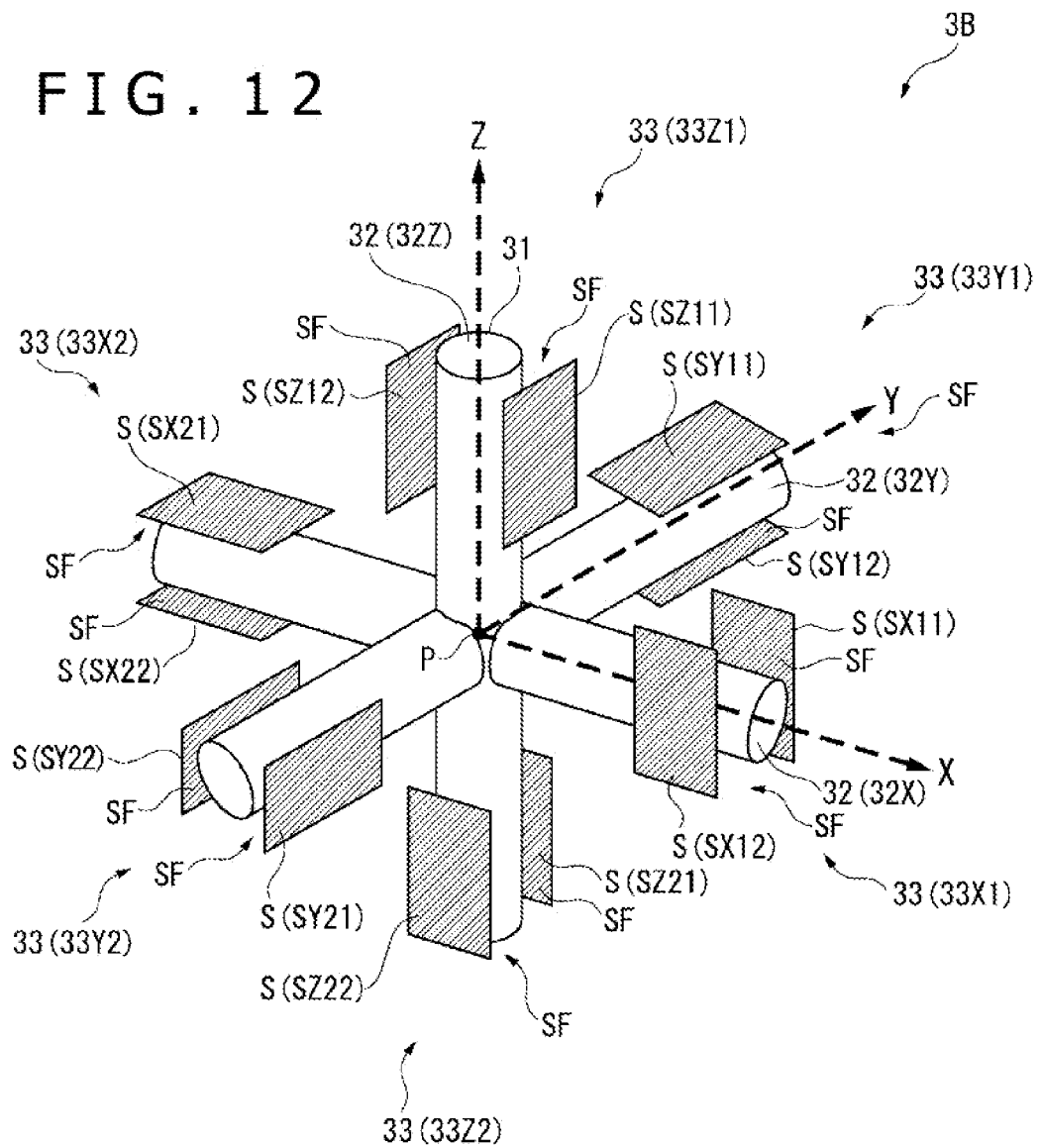
FIG. 12 is a view illustrating another modification to the manipulator in the first embodiment.

FIG. 12 is a schematic view depicting a general configuration of a manipulator 3B which is a modification to the manipulator 3 described hereinabove.

For example, the manipulator 3B which is a modification to the manipulator 3 has a configuration similar to that of the manipulator 3 except that the location of the pressure-sensitive elements S which configure the detection bodies 33 is different from that in the manipulator 3.

In the present manipulator 3B, the pressure-sensitive elements SX11 and SX12 of the first detection body 33X1 are located at the distal side of the bar-shaped portion 32X in the X direction such that the detection faces SF thereof sandwich the bar-shaped portion 32X therebetween as depicted in FIG. 12. The detection faces SF extend in parallel to each other along the XZ plane.

Meanwhile, the pressure-sensitive elements SX21 and SX22 of the second detection body 33X2 are located at the proximal side of the bar-shaped portion 32X in the X direction such that the detection faces SF thereof sandwich the bar-shaped portion 32X therebetween. The detection faces SF extend in parallel to each other along the XY plane orthogonal to the XZ plane.

The pressure-sensitive elements SY11 and SY12 of the third detection body 33Y1 are located at the distal side of the bar-shaped portion 32Y in the Y direction such that the detection faces SF thereof sandwich the bar-shaped portion 32Y therebetween. The detection faces SF extend in parallel to each other along the XY plane. Further, the pressure-sensitive elements SY21 and SY22 of the fourth detection body 33Y2 are located at the proximal side of the bar-shaped portion 32Y in the Y direction such that the detection faces SF thereof sandwich the bar-shaped portion 32Y therebetween. The detection faces SF extend in parallel to each other along the YZ plane orthogonal to the XY plane.

The pressure-sensitive elements SZ11 and SZ12 of the fifth detection body 33Z1 are located at the distal side of the bar-shaped portion 32Z in the Z direction such that the detection faces SF thereof sandwich the bar-shaped portion 32Z therebetween. The detection faces SF extend in parallel to each other along the YZ plane. Further, the pressure-sensitive elements SZ21 and SZ22 of the sixth detection body 33Z2 are located at the proximal side of the bar-shaped portion 32Z in the Z direction such that the detection faces SF thereof sandwich the bar-shaped portion 32Z therebetween. The detection faces SF extend in parallel to each other along the XZ plane orthogonal to the YZ plane.

In particular, in the manipulator 3B, the detection faces SF of the pressure-sensitive elements SX11 and SX12, the detection faces SF of the pressure-sensitive elements SY11 and SY12 and the detection faces SF of the pressure-sensitive elements SZ11 and SZ12 intersect orthogonally with each other. Further, the detection faces SF of the pressure-sensitive elements SX21 and SX22, the detection faces SF of the pressure-sensitive elements SY21 and SY22 and the detection faces SF of the pressure-sensitive elements SZ21 and SZ22 intersect orthogonally with each other.

In such a manipulator 3B as described above, a translational movement of the manipulation body 31 along the X direction is detected by the fourth detection body 33Y2 and the fifth detection body 33Z1 having the detection faces SF along the YZ plane.

A translational movement of the manipulation body 31 along the Y direction is detected by the first detection body 33X1 and the sixth detection body 33Z2 having the detection faces SF along the XZ plane.

A translational movement of the manipulation body 31 along the Z direction is detected by the second detection body 33X2 and the third detection body 33Y1 having the detection faces SF along the XY plane.

Meanwhile, a pivotal movement of the manipulation body 31 around the axis of pivotal movement along the X direction is detected by the third detection body 33Y1 having the detection faces SF along the XY plane and the sixth detection body 33Z2 having the detection faces SF along the XZ plane.

A pivotal movement of the manipulation body 31 around the axis of pivotal movement along the Y direction is detected by the second detection body 33X2 having the detection faces SF along the XY plane and the fifth detection body 33Z1 having the detection faces SF along the YZ plane.

A pivotal movement of the manipulation body 31 around the axis of pivotal movement along the Z direction is detected by the first detection body 33X1 having the detection faces SF along the XZ plane and the fourth detection body 33Y2 having the detection faces SF along the YZ plane.

Also in the manipulation apparatus having the manipulator 3B in which the pressure-sensitive elements S are located in this manner, effects similar to those achieved by the manipulation apparatus 1 having the manipulator 3 can be achieved. It is to be noted that locations of the pressure-sensitive elements S of the first detection body 33X1 and the second detection body 33X2 may be replaced by each other. This similarly applies also to the locations of the pressure-sensitive elements S of the third detection body 33Y1 and the fourth detection body 33Y2 and the locations of the pressure-sensitive elements S of the fifth detection body 33Z1 and the sixth detection body 33Z2.

Second Embodiment

Now, a second embodiment according to the mode of the present invention is described.

The manipulation apparatus according to the present embodiment is different from the manipulation apparatus 1 in that a manipulator which includes a plurality of detection bodies having a strain gauge is adopted. It is to be noted that, in the following description, parts same or substantially same as the parts described already are denoted by like reference characters and description of them is omitted.

Figure 13:
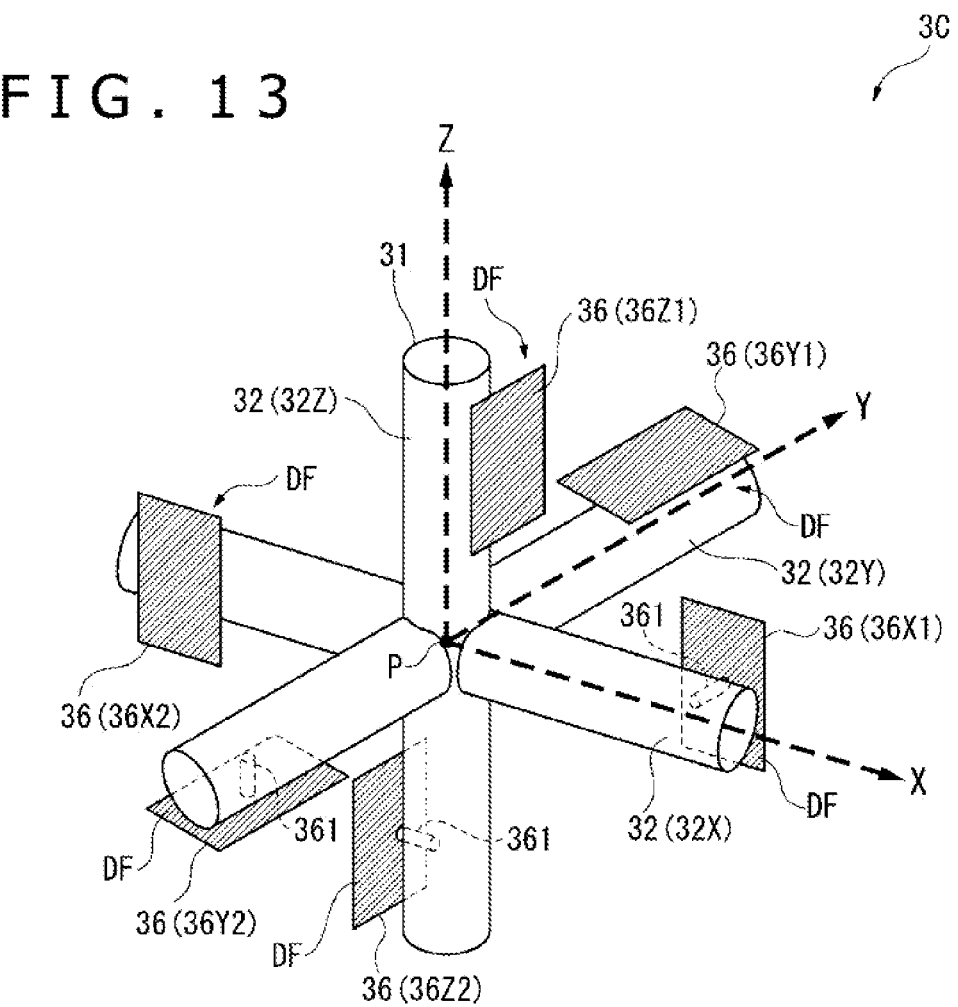
FIG. 13 is a schematic view depicting a general configuration of a manipulator which a manipulation apparatus of a second embodiment according to the mode of the present invention has.
Figure 14:
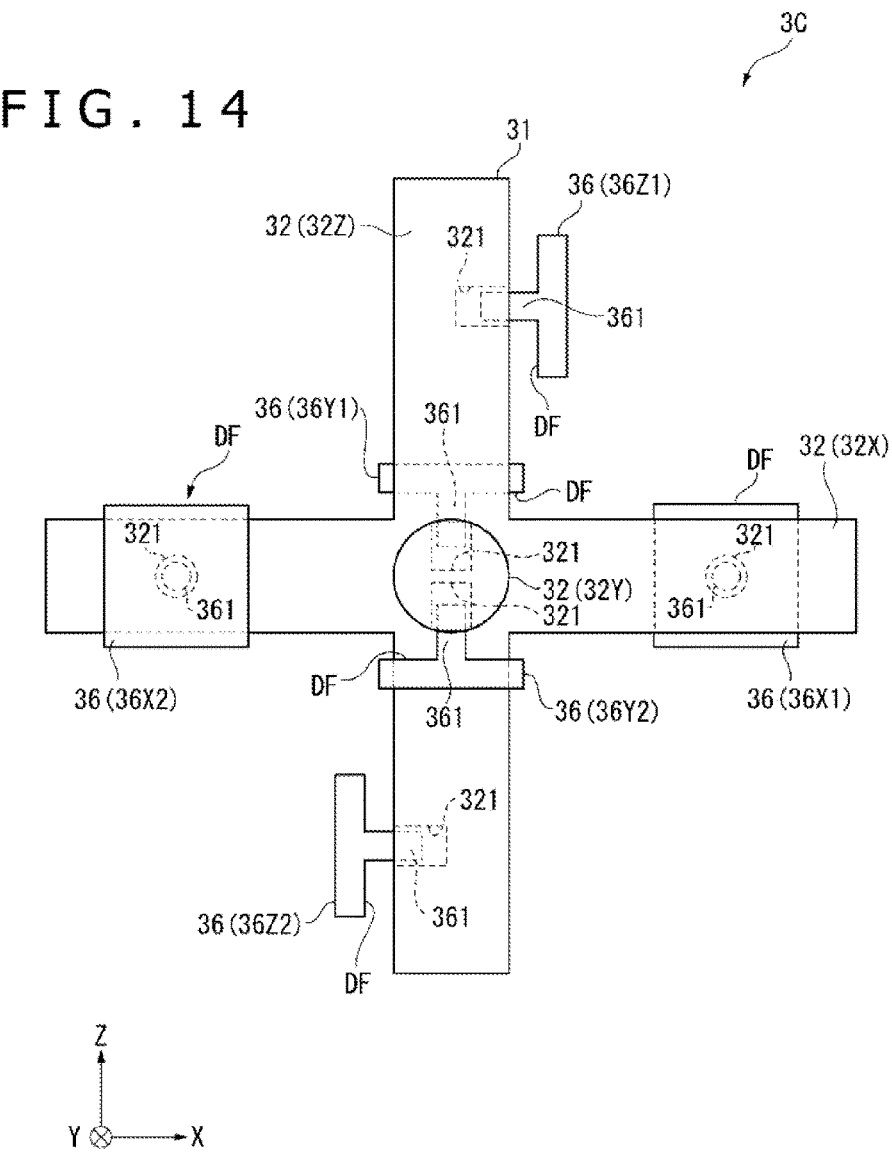
FIG. 14 is a side elevational view schematically depicting the manipulator in the second embodiment.

FIG. 13 is a schematic view depicting a general configuration of a manipulator 3C. Meanwhile, FIG. 14 is a side elevational view when the manipulator 3C is viewed from the proximal side in the Y direction. It is to be noted that, in FIGS. 13 and 14, illustration of components other than the manipulation body 31 and detection bodies 36 is omitted.

The manipulation apparatus according to the present embodiment has a configuration and functions similar to those of the manipulation apparatus 1 described hereinabove except that it has the manipulator 3C in place of the manipulator 3. Further the manipulator 3C has a configuration and functions similar to those of the manipulator 3 except that it has a detection body 36 in place of the detection body 33.

The detection body 36 is configured from a single-axis strain gauge (strain gauge which detects only a stress in one direction). This strain gauge has a protrusion 361 which protrudes from a detection face DF and engages with the manipulation body 31, and a detection portion (not depicted) which detects the direction of pressure acting upon the protrusion 361. From between them, the protrusion 361 is inserted in a hole portion 321 formed in each of the bar-shaped portions 32X, 32Y and 32Z corresponding to the protrusion 361.

Such detection bodies 36 are located in the proximity of end portions at one end side and the other end side in a direction along the center axes of the bar-shaped portions 32X, 32Y and 32Z across the above-described intersection point P. Further, each of the detection bodies 36 detects, by the strain gauge thereof, from among the displacements of the manipulation body 31 described hereinabove, a displacement in a direction which is orthogonal to the extending direction of the bar-shaped portion 32 corresponding to the detection body 36 and besides extends along the detection face DF.

In particular, a first detection body 36X1 and a second detection body 36X2 are located in the proximity of end portions at the distal side and the proximal side of the bar-shaped portion 32X in the X direction. The strain gauges which the first detection body 36X1 and the second detection body 36X2 have detect a displacement of the manipulation body 31 (bar-shaped portion 32X) in the Z direction. By such a first detection body 36X1 and a second detection body 36X2 as described above, the translational movement along the Z direction and the pivotal movement around the axis of pivotal movement along the Y direction are detected from among the displacements of the manipulation body 31.

Further, in the proximity of end portions of the bar-shaped portion 32Y at the distal side and the proximal side in the Y direction, a third detection body 36Y1 and a fourth detection body 36Y2 are located, respectively. The strain gauges which the third detection body 36Y1 and the fourth detection body 36Y2 have detect a displacement of the manipulation body 31 (bar-shaped portion 32Y) along the X direction. By such third detection body 36Y1 and fourth detection body 36Y2 as described above, the translational movement along the X direction and the pivotal movement around the center of pivotal movement along the Z direction are detected from among the displacements of the manipulation body 31.

Furthermore, in the proximity of end portions of the bar-shaped portion 32Z at the distal side and the proximal side in the Z direction, a fifth detection body 36Z1 and a sixth detection body 36Z2 are located, respectively. The strain gauges which the fifth detection body 36Z1 and the sixth detection body 36Z2 have detect a displacement of the manipulation body 31 (bar-shaped portion 32Z) along the Y direction. By such fifth detection body 36Z1 and sixth detection body 36Z2 as described above, the translational movement along the Y direction and the pivotal movement around the center of pivotal movement along the X direction are detected from among the displacements of the manipulation body 31.

With the manipulation apparatus having such a manipulator 3C as described above, effects similar to those achieved by the manipulation apparatus 1 having the manipulator 3 described hereinabove can be achieved.

In particular, the detection face DF of the first detection body 36X1 extends along the XZ plane. The first detection body 36X1 detects a displacement of the manipulation body 31 along the Z direction. Further, a translational movement of the manipulation body 31 along the Z direction is detected by the first detection body 36X1. Similarly, a translational movement of the manipulation body 31 along the same direction is detected by the second detection body 36X2.

Further, the detection face DF of the first detection body 36X1 and the detection face DF of the second detection body 36X2 extend in parallel to each other, and the first detection body 36X1 and the second detection body 36X2 are located in such a manner as to sandwich the bar-shaped portion 32X therebetween. From this, a pivotal movement of the manipulation body 31 around the axis of pivotal movement along the Y direction is detected by the first detection body 36X1 and the second detection body 36X2.

Further, the detection face DF of the third detection body 36Y1 extends along the XY plane. Further, the third detection body 36Y1 detects a displacement of the manipulation body 31 along the X direction. Further, a translational movement of the manipulation body 31 along the X direction is detected by the third detection body 36Y1.

By the first detection body 36X1, second detection body 36X2 and third detection body 36Y1, the translational movement along the XZ plane and the pivotal movement around the axis of pivotal movement along the Y direction can be detected from among the displacements of the manipulation body 31. Accordingly, in comparison with an orthogonal two-axis analog stick, the number of displacement directions of the manipulation body 31 which can be detected can be increased. This similarly applies also to the other detection bodies 36.

Further, the detection face DF of the third detection body 36Y1 And the detection face DF of the fourth detection body 36Y2 extend in parallel to each other with respect to the XY plane. Further, the fourth detection body 36Y2 detects the displacement of the manipulation body 31 along the X direction. From this, the pivotal movement around the axis of pivotal movement along the Z direction can be detected in addition to the translational movement along the X direction from among the displacements of the manipulation body 31 by the third detection body 36Y1 and the fourth detection body 36Y2. Accordingly, the number of displacement directions of the manipulation body 31 which can be detected can be increased further.

The detection face DF of the fifth detection body 36Z1 and the detection face DF of the sixth detection body 36Z2 extend in parallel to each other with respect to the YZ plane. Further, the fifth detection body 36Z1 and the sixth detection body 36Z2 detect the displacement of the manipulation body 31 along the Y direction. From this, the translational movement along the Y direction and the pivotal movement around the center of pivotal movement long the X direction can be detected from among the displacements of the manipulation body 31 by the fifth detection body 36Z1 and the sixth detection body 36Z2. Accordingly, the number of displacement directions of the manipulation body 31 which can be detected can be increased further.

It is to be noted that, while, in the second embodiment described hereinabove, a single-axis strain gauge is adopted, an orthogonal two-axis strain gauge may be adopted in place of the single-axis strain gauge. In this case, the strain gauges provided corresponding to the bar-shaped portions 32X, 32Y and 32Z may be provided one by one for the bar-shaped portions 32, and the number of strain gauges provided in the manipulator can be reduced.

First Modification to the Second Embodiment

In the manipulator 3C described above, the detection faces DF of the first detection body 36X1 and the second detection body 36X2 extend along the XZ plane. Further, the detection faces DF of the third detection body 36Y1 and the fourth detection body 36Y2 extend along the XY plane. Furthermore, the detection faces DF of the fifth detection body 36Z1 and the sixth detection body 36Z2 extend along the YZ plane. However, if a pair of detection bodies 36 sandwiching each bar-like portion therebetween are provided and the detection faces DF of the paired detection bodies 36 are located such that they are directed to the corresponding bar-shaped portion 32X and sandwich the bar-shaped portion 32X therebetween similarly as in the case of the above-described manipulator 3A, then the relationship between the bar-shaped portions 32 and the detection faces SF is not limited to the location described above.

Figure 15:
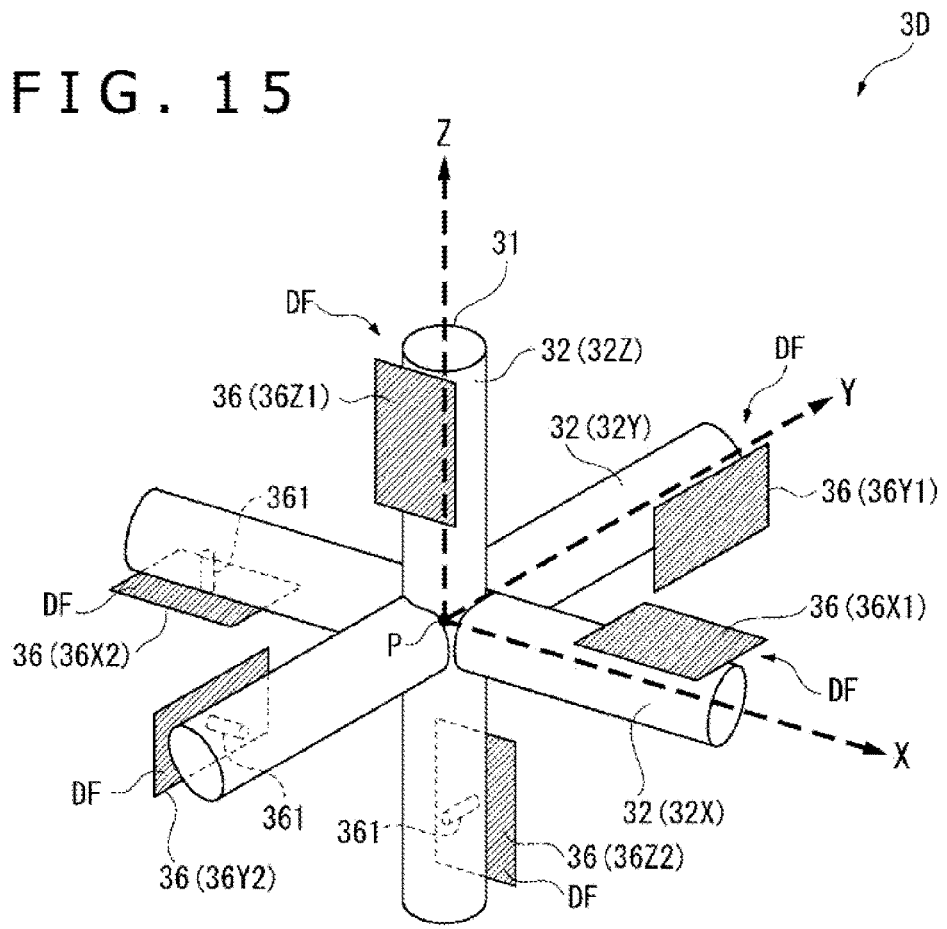
FIG. 15 is a view illustrating a modification to the manipulator in the second embodiment.

FIG. 15 is a schematic view depicting a general configuration of a manipulator 3D which is a modification to the manipulator 3C. It is to be noted that, in FIG. 15, illustration of components other than the manipulation body 31 and the detection body 36 is omitted. The manipulator 3D which is a modification to the manipulator 3C has a configuration and functions similar to those of the manipulator 3C except that the location of the detection bodies 36 is different from that of the manipulator 3C.

In the present manipulator 3D, the first detection body 36X1 and the second detection body 36X2 are located at the distal side and the proximal side in the X direction, respectively, such that the detection faces DF thereof sandwich the bar-shaped portion 32X therebetween as depicted in FIG. 15. The detection faces DF extend in parallel to each other along the XY plane. The strain gauges which the first detection body 36X1 and the second detection body 36X2 have detect a displacement of the manipulation body 31 along the Y direction.

Meanwhile, the third detection body 36Y1 and the fourth detection body 36Y2 are located at the distal side and the proximal side in the Y direction such that the detection faces DF thereof sandwich the bar-shaped portion 32X therebetween. The detection faces DF extend in parallel to each other along the YZ plane. The strain gauges which the third detection body 36Y1 and the fourth detection body 36Y2 have detect a displacement of the manipulation body 31 along the Z direction.

Further, the fifth detection body 36Z1 and the sixth detection body 36Z2 are located at the distal side and the proximal side in the Z direction, respectively, such that the detection faces DF thereof sandwich the bar-shaped portion 32Z therebetween. The detection faces DF extend in parallel to each other along the XZ plane. The strain gauges which the fifth detection body 36Z1 and the sixth detection body 36Z2 have detect a displacement of the manipulation body 31 along the X direction.

In such a manipulator 3D as described above, the translational movement in the Y direction and the pivotal movement around the axis of pivotal movement along the Z direction are detected from among the displacements of the manipulation body 31 by the first detection body 36X1 and the second detection body 36X2.

Further, the translational movement in the Z direction and the pivotal movement around the axis of pivotal movement along the X direction are detected from among the displacements of the manipulation body 31 by the third detection body 36Y1 and the fourth detection body 36Y2.

Furthermore, the translational movement in the X direction and the pivotal movement around the axis of pivotal movement along the Y direction are detected from among the displacements of the manipulation body 31 by the fifth detection body 36Z1 and the sixth detection body 36Z2.

Accordingly, similar effects to those achieved by the manipulation apparatus having the above-described manipulator 3C can be achieved also by the manipulation apparatus having the manipulator 3D.

Second Modification to the Second Embodiment

The detection bodies 36 provided at the opposite ends of a corresponding bar-shaped portion 32 may be located such that the detection faces DF thereof intersect orthogonally with each other similarly as in the manipulator 3B described hereinabove.

A manipulator 3E which is a modification to the manipulator 3C has a configuration and functions similar to those of the manipulator 3C except that the location position of the detection bodies 36 is different.

Figure 16:
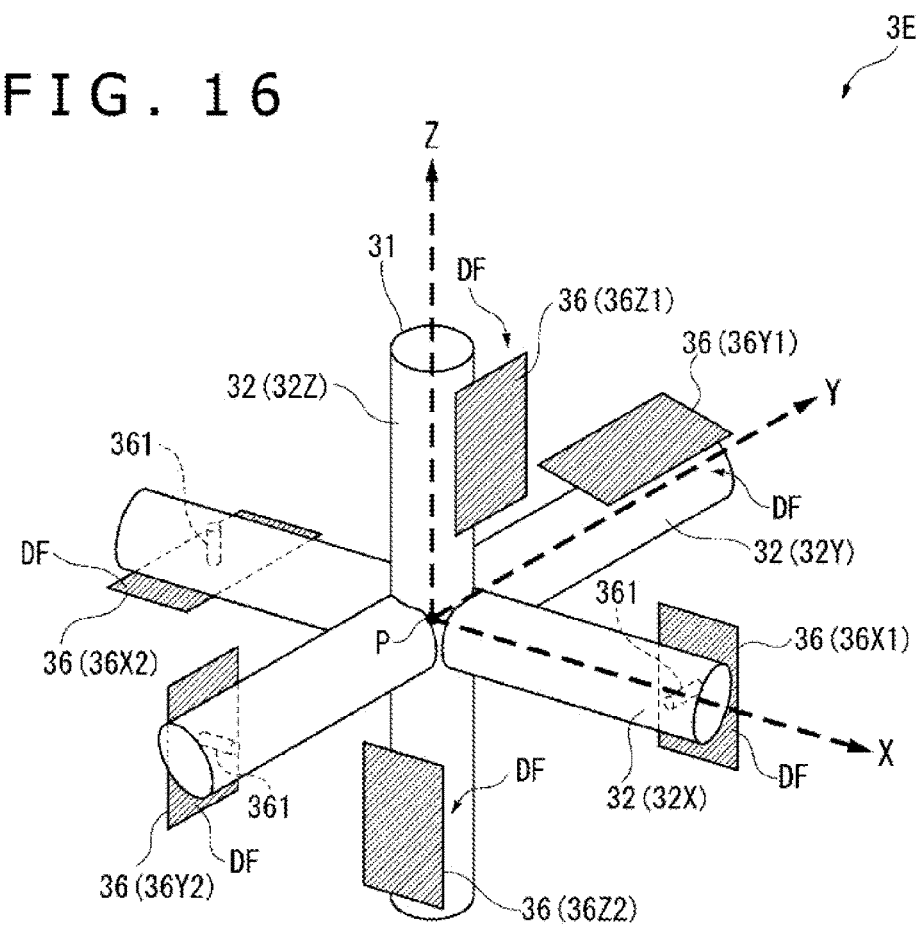
FIG. 16 is a view illustrating another modification to the manipulator in the second embodiment.

FIG. 16 is a schematic view depicting a general configuration of the manipulator 3E which is a modification to the manipulator 3C. It is to be noted that, in FIG. 16, illustration of components other than the manipulation bodies 31 and the detection bodies 36 is omitted.

In the present manipulator 3E, the detection face DF of the first detection body 36X1 extends along the XZ plane while the detection face DF of the second detection body 36X2 extends along the XY plane. From between them, the first detection body 36X1 detects a displacement of the manipulation body 31 along the Z direction. Meanwhile, the second detection body 36X2 detects a displacement of the manipulation body 31 in the Y direction.

Further, the detection face DF of the third detection body 36Y1 extends along the XY plane while the detection face DF of the fourth detection body 36Y2 extends along the YZ plane. From between them, the third detection body 36Y1 detects a displacement of the manipulation body 31 along the X direction. Meanwhile, the fourth detection body 36Y2 detects a displacement of the manipulation body 31 along the Z direction.

Furthermore, the detection face DF of the fifth detection body 36Z1 extends along the YZ plane while the detection face DF of the sixth detection body 36Z2 extends along the XZ plane. From between them, the fifth detection body 36Z1 detects a displacement of the manipulation body 31 along the Y direction. Meanwhile, the sixth detection body 36Z2 detects a displacement of the manipulation body 31 along the X direction.

In particular, the detection faces DF of the first detection body 36X1, second detection body 36X2 and fifth detection body 36Z1 intersect orthogonally with each other, and the detection faces DF of the third detection body 36Y1, fourth detection body 36Y2 and sixth detection body 36Z2 intersect orthogonally with each other.

In such a manipulator 3E as described above, the displacements of the manipulation body 31 are detected in the following manner.

The translational movement of the manipulation body 31 along the Z direction is detected by the first detection body 36X1 and the fourth detection body 36Y2.

The translational movement of the manipulation body 31 along the Y direction is detected by the second detection body 36X2 and the fifth detection body 36Z1.

The translational movement of the manipulation body 31 along the X direction is detected by the third detection body 36Y1 and the sixth detection body 36Z2.

The pivotal movement of the manipulation body 31 around the axis of pivotal movement along the Y direction is detected by the first detection body 36X1 and the sixth detection body 36Z2 whose detection faces DF individually extend along the XZ plane.

The pivotal movement of the manipulation body 31 around the axis of pivotal movement along the Z direction is detected by the second detection body 36X2 and the third detection body 36Y1 whose detection faces DF individually extend along the XY plane.

The pivotal movement of the manipulation body 31 around the axis of pivotal movement along the X direction is detected by the fourth detection body 36Y2 and the fifth detection body 36Z1 whose detection faces DF individually extend along the YZ plane.

With the manipulation apparatus having such a manipulator 3E as described above, similar effects to those achieved by the manipulation apparatus having the above-described manipulator 3C are achieved. It is to be noted that only it is necessary for the location of the three detection bodies 36 to be determined such that the detection faces DF of them intersect orthogonally with each other and besides the detection faces of the other three detection bodies 36 intersect orthogonally with each other, and the location is not limited to that described above. With such a location as described above, the translational movements along the XY plane, XZ plane and YZ plane and the pivotal movements around the axes of pivotal movement along the X direction, Y direction and Z direction from among the displacements of the manipulation body 31 can be detected by the detection bodies 36. In the case of such a configuration as just described, the number of detection bodies 36 can be reduced.

Modifications to the Embodiments

The present invention is not limited to the embodiments described above, and modifications, improvements and so forth within a range within which the object of the present invention can be achieved are included in the present invention.

In the first embodiment described hereinabove, the detection body 33 is configured such that it has a pair of pressure-sensitive elements S having detection faces SF opposed to each other. Meanwhile, in the second embodiment described hereinabove, the detection body 36 is configured such that it has a strain gauge having a detection face DF. However, the present invention is not limited to them. In other words, also it is possible to adopt detection bodies having other mechanical sensors, displacement sensors and optical sensors. As the sensors, an angle sensor, a Hall element and a potentiometer can be exemplified. Also it is possible to adopt, as the pressure-sensitive element S, a pressure-sensitive element which can detect a pressing position, a pressing area and pressing force on the detection face. In this case, the number of detection bodies to be located on the manipulator 3 can be reduced.

While, in the embodiments described hereinabove, the manipulation body 31 is configured such that it has three bar-shaped portions 32 (32X 32Y, 32Z) which intersect orthogonally with each other at the single intersection point P set to the centers of them, the present invention is not limited to this. For example, a manipulation body having only two bar-shaped portions 32 (for example, bar-shaped portions 32X and 32Y) intersecting orthogonally with each other at a single point except the opposite ends may be adopted. In this case, in the proximity of the opposite end portions of one of the bar-like portions, detection bodies for detecting a displacement of the end portions may be located while, in the proximity of at least one end portion of the other bar-like portion, a detection body for detecting a displacement of the end portion is located. By the detection bodies located in this manner, a greater number of displacement directions of the manipulation body than that of the above-described orthogonal two-axis analog stick can be detected.

While, in the first embodiment described hereinabove, the elastic member 34 as a biasing member for positioning the bar-shaped portion 32 between the pair of the pressure-sensitive elements S (more particularly, detection faces SF) is provided on the manipulation body 31, the present invention is not limited to this. For example, a configuration wherein a bar-like portion is located between a pair of pressure-sensitive elements S by some other component such as a spring in place of the elastic member 34 may be adopted. Further, a component for exerting such biasing force (elastic force) to act upon the manipulation body 31 may be provided on a detection body, a housing or the like.

While, in the first embodiment described hereinabove, the gaps between the bar-shaped portion 32X and the detection faces SF of each pressure-sensitive element S are equal between the bar-shaped portion 32 and the detection body 33, the present invention is not limited to this. In particular, the stroke amount when the manipulation body 31 is displaced and the range (so-called allowance) within which the displacement of the manipulation body 31 is detected may be adjusted by adjusting the dimension of the gap between the bar-like portion and each detection faces SF.

In the first embodiment described hereinabove, the detection body 33 is configured such that it outputs a reference voltage when any of the detection faces SF of each pressure-sensitive element S is not pressed, but outputs, when one of the detection faces SF is pressed, a first voltage lower than the reference voltage and outputs, when the other of the detection faces SF is pressed, a second voltage higher than the reference voltage. However, the resent invention is not limited to this. In particular, the detection body 33 may be configured such that the pressure-sensitive elements S are connected separately from each other to a control apparatus and a voltage corresponding to pressing force when a detection face SF of the pressure-sensitive element S is pressed is outputted from the pressure-sensitive element S to the control apparatus.

It is described that, in the embodiments described hereinabove, the bar-shaped portion 32 extending along the X direction is the bar-shaped portion 32X while the bar-shaped portion 32 extending along the Y direction is the bar-shaped portion 32Y and the bar-shaped portion 32 extending along the Z direction is the bar-shaped portion 32Z. Further, it is described that the manipulators 3 and 3A to 3E are provided in a manipulation apparatus in accordance with the directions mentioned. However, the present invention is not limited to this. In other words, the directions of the X direction, Y direction and Z direction may be made different individually and the components of the manipulator may be located in accordance with the three directions orthogonal to each other. For example, the region described as the bar-shaped portion 32Z extending along the Z direction may be read into the bar-shaped portion 32X extending along the X direction. Further, the fifth detection body 33Z1 or 36Z1 and the sixth detection body 33Z2 or 36Z2 provided corresponding to the bar-shaped portion 32Z may be read into the first detection body 33X1 or 36X1 and the second detection body 33X2 or 36X2.

Furthermore, the X direction, Y direction and Z direction defined with regard to the manipulator and the X direction, Y direction and Z direction defined with regard to the manipulation apparatus may not strictly coincide with each other.

While, in the embodiments described hereinabove, the outer diameter dimension of the bar-shaped portion 32Z is greater than the outer diameter dimension of the bar-shaped portions 32X and 32Y, the present invention is not limited to this. In other words, the outer diameter dimensions mentioned may be equal to each other or may be different from each other. Further, while it is described that the bar-shaped portions 32X, 32Y and 32Z intersect orthogonally with each other at the intersection point P set at the centers of them, the present invention is not limited to this, and only it is necessary for the intersection point P to be set to any other position than end portions of the bar-shaped portions 32X, 32Y and 32Z.

While, in the embodiments described above, the manipulation apparatus of the present invention is described as a manipulation apparatus connected to an information processing apparatus, the present invention is not limited to this. For example, a configuration wherein the manipulation apparatus is provided in a portable information terminal (portable terminal) may be adopted.

[Configuration, Action and Effect of the Manipulator and the Manipulation Apparatus]

The manipulator described hereinabove is characterized in that the manipulator includes a manipulation body having a plurality of bar-shaped portions which intersect orthogonally with each other at one intersection point, and a plurality of detection bodies which detect a displacement of the manipulation body, the plural bar-shaped portions including a first bar-shaped portion and a second bar-shaped portion which intersect orthogonally with each other, the plural detection bodies including a first detection body which detects a displacement of one end side of the first bar-shaped portion with respect to the intersection point, a second detection body which detects a displacement of the other end side of the first bar-shaped portion with respect to the intersection point, and a third detection body which detects a displacement of one end side of the second bar-shaped portion with respect to the intersection point.

As such detection bodies as described above, a pair of pressure sensitive elements having detection faces (faces for detecting pressure) which sandwich a manipulation body therebetween and one of which is pressed upon displacement of the manipulation body and a strain gauge which detects displacements of a manipulation body on two orthogonal axes can be exemplified.

It is to be noted that intersection of bar-shaped bodies with each other includes a case in which the bar-shaped bodies intersect orthogonally with each other and another case in which the bar-shaped bodies intersect substantially orthogonally with each other.

In the following description, a direction along the center axis of the first bar-shaped portion is represented as X direction, a direction along the center axis of the second bar-shaped member is represented as Y direction, and a direction orthogonal to the X direction and the Y direction is represented as Z direction.

For example, where the paired pressure-sensitive elements are adopted as the detection bodies, a displacement of the manipulation body is detected in the following manner. It is to be noted that, in the following description, the description that a detection face extends in parallel to a certain plane (including a different detection face) and the description that a detection face extends along a certain plane represent that an extension plane of the detection face extends in parallel to an extension plane of the certain plane. Further, the description that a detection face is orthogonal to a certain plane represents that an extension plane of the detection face is orthogonal or substantially orthogonal to an extension plane of the certain plane.

By locating the detection faces of the pressure-sensitive elements of the first detection body along the XZ plane as depicted in FIGS. 2 and 12, at least one of the translational movement along the Y direction and the pivotal movement around the axis of pivotal movement along the Z direction from among the displacements of the manipulation body can be detected by the first detection body.

Further, by locating the detection faces of the pressure-sensitive elements of the second detection body along the XZ plane as depicted in FIG. 2, the translational movement along the Y direction and the pivotal movement around the axis of pivotal movement along the Z direction from among the displacements of the manipulation body can be detected with certainty by the first detection body and the second detection body. Meanwhile, by locating the detection faces of the pressure-sensitive elements of the second detection body along the XY plane as depicted in FIG. 12, at least one of the translational movement along the Y direction and the pivotal movement around the axis of pivotal movement along the Y direction from among the displacements of the manipulation body can be detected by the second detection body.

Alternatively, by locating the detection faces of the pressure-sensitive elements of the first detection body along the XY plane as depicted in FIG. 11, at least one of the translational movement along the Z direction and the pivotal movement around the axis of pivotal movement along the Y direction from among the displacements of the manipulation body can be detected by the first detection body.

Further, by locating the detection faces of the pressure-sensitive elements of the second detection body along the XY plane, the translational movement along the Z direction and the pivotal movement around the axis of pivotal movement along the Y direction from among the displacements of the manipulation body can be detected with certainty by the first detection body and the second detection body. It is to be noted that, where the detection faces of the pressure-sensitive elements of the second detection body are located along the XZ plane, at least one of the translational movement along the Y direction and the pivotal movement around the axis of pivotal movement along the Z direction from among the displacements of the manipulation body can be detected by the second detection body similarly as in the case described hereinabove.

Further, by locating the detection faces of the pressure-sensitive elements of the third detection body along the XY plane as depicted in FIGS. 2 and 12, at least one of the translational movement along the Z direction and the pivotal movement around the axis of pivotal movement along the X direction from among the displacements of the manipulation body can be detected by the third detection body. Thereupon, where the detection faces of a different detection body extend along the XY plane, the translational movement along the Z direction and the pivotal movement around the axis of pivotal movement along the X direction from among the displacements of the manipulation body can be detected with certainty by the different detection body and the third detection body. Further, by locating the detection faces along the YZ plane as depicted in FIG. 11, at least one of the translational movement along the X direction and the pivotal movement around the axis of pivotal movement along the Z direction from among the displacements of the manipulation body can be detected by the third detection body.

Accordingly, by locating the first to third detection bodies in such a manner as described above, the number of displacement directions of the manipulation body which can be detected can be increased in comparison with the afore-described orthogonal two-axis analog switch.

On the other hand, where the above-described strain gauge (single-axis strain gauge) is adopted as the detection bodies, a displacement of the manipulation body is detected in the following manner. It is to be noted that a detection face of a detection body is a face for detecting a displacement of a manipulation body which is a target of detection and is a face on which a protrusion which engages with the manipulation body is provided in a projecting manner. Further, a displacement direction of the manipulation body detected by each strain gauge is a direction which is orthogonal to an extension direction of a bar-shaped portion with which the protrusion of the strain gauge engages and which extends along the detection face of the strain gauge.

By locating the detection faces of the first detection body along the XZ plane as depicted in FIGS. 13 and 16, at least one of the translational movement in the Z direction and the pivotal movement around the axis of pivotal movement along the Y direction from among the displacements of the manipulation body can be detected by the first detection body.

Further, by locating the detection faces of the second detection body along the XZ plane as depicted in FIG. 13, the translational movement along the Z direction and the pivotal movement around the axis of pivotal movement along the Y direction from among the displacements of the manipulation body can be detected with certainty by the first detection body and the second detection body. Meanwhile, by locating the detection faces of the second detection body along the XY plane as depicted in FIG. 16, at least one of the translational movement along the Y direction and the pivotal movement around the axis of pivotal movement along the Z direction from among the displacements of the manipulation body can be detected by the second detection body.

Alternatively, by locating the detection faces of the first detection body along the XY plane as depicted in FIG. 15, at least one of the translational movement in the Y direction and the pivotal movement around the axis of pivotal movement along the Z direction from among the displacements of the manipulation body can be detected by the first detection body.

Further, by locating the detection faces of the second detection body along the XY plane, the translational movement along the Y direction and the pivotal movement around the axis of pivotal movement along the Z direction from among the displacements of the manipulation body can be detected with certainty by the first detection body and the second detection body. It is to be noted that, where the detection faces of the second detection body are located along the XZ plane, at least one of the translational movement along the Z direction and the pivotal movement around the axis of pivotal movement along the Y direction from among the displacements of the manipulation body can be detected by the second detection body similarly as in the case described hereinabove.

Further, by locating the detection faces of the third detection body along the XY plane as depicted in FIGS. 13 and 16, at least one of the translational movement along the X direction and the pivotal movement around the axis of pivotal movement along the Z direction from among the displacements of the manipulation body can be detected by the third detection body.

Further, by locating the detection faces of the third detection body along the YZ plane as depicted in FIG. 15, at least one of the translational movement along the Z direction and the pivotal movement around the axis of pivotal movement along the X direction from among the displacements of the manipulation body can be detected by the third detection body.

Accordingly, by locating the first to third detection bodies in such a manner as described above, the number of displacement directions of the manipulation body which can be detected can be increased in comparison with the above-described orthogonal two-axis analog switch. It is to be noted that, if an orthogonal two-axis strain gauge is adopted as the single axis strain gauge, then the number of displacement directions of the manipulation body which can be detected can be further increased by the first to third detection bodies.

Preferably, the manipulator is configured such that the plural detection bodies include a fourth detection body which detects a displacement of the other end side of the second bar-shaped portion with respect to the intersection point.

For example, if the above-descried paired pressure-sensitive elements are adopted as the detection bodies, then a displacement of the manipulation body can be detected in the following manner.

In particular, by locating the detection faces of the fourth detection body along the XY plane as depicted in FIG. 2, at least one of the translational movement along the Z direction and the pivotal movement around the axis of pivotal movement along the X direction from among the displacements of the manipulation body can be detected with certainty by the fourth detection body. Thereupon, if the detection faces of the third detection body and the detection faces of the fourth detection body extend in parallel to each other, then the translational movement along the Z direction and the pivotal movement around the axis of pivotal movement along the X direction from among the displacements of the manipulation body can be detected with certainty by the third detection body and the fourth detection body.

On the other hand, by locating the detection faces of the fourth detection body along the YZ plane as depicted in FIG. 11, at least one of the translational movement along the X direction and the pivotal movement around the axis of pivotal movement along the Z direction can be detected by the fourth detection body. Thereupon, if the detection faces of the third detection body and the detection faces of the fourth detection body extend in parallel to each other, then the translational movement along the X direction and the pivotal movement around the axis of pivotal movement along the Z direction from among the displacements of the manipulation body can be detected with certainty by the third detection body and the fourth detection body.

On the other hand, if the above-described strain gauge is adopted as the detection bodies, then the displacements of the manipulation body can be detected in the following manner.

In particular, by locating the detection faces of the fourth detection body along the XY plane as depicted in FIG. 13, at least one of the translational movement along the X direction and the pivotal movement around the axis of pivotal movement along the Z direction from among the displacements of the manipulation body can be detected by the fourth detection body. Thereupon, if the detection faces of the third detection body and the detection faces of the fourth detection body extend in parallel to each other, then the translational movement along the X direction and the pivotal movement around the axis of pivotal movement along the Z direction from among the displacements of the manipulation body can be detected with certainty by the third detection body and the fourth detection body.

On the other hand, by locating the detection faces of the fourth detection body along the YZ plane as depicted in FIG. 15, at least one of the translational movement along the Z direction and the pivotal movement around the axis of pivotal movement along the X direction can be detected by the fourth detection body. Thereupon, if the detection faces of the third detection body and the detection faces of the fourth detection body extend in parallel to each other, then the translational movement along the Z direction and the pivotal movement around the axis of pivotal movement along the X direction from among the displacements of the manipulation body can be detected with certainty by the third detection body and the fourth detection body.

Accordingly, the number of displacement directions of the manipulation body which can be detected can be increased further by providing the fourth detection body.

Preferably, the manipulator is configured such that the plural bar-shaped portions include a third bar-shaped portion intersecting orthogonally with the first bar-shaped portion and the second bar-shaped portion at the intersection point, and the plural detection bodies include a fifth detection body which detects a displacement of one end side of the third bar-shaped portion with respect to the intersection point, and a sixth detection body which detects a displacement of the other end side of the third bar-shaped portion with respect to the intersection point.

For example, where the above-descried paired pressure-sensitive elements are adopted as the fifth detection body and the sixth detection body, a displacement of the manipulation body can be detected in the following manner. In particular, by locating the detection faces of the pressure-sensitive elements of the fifth detection body along the YZ plane as depicted in FIGS. 2 and 12, at least one of the translational movement along the X direction and the pivotal movement around the axis of pivotal movement along the Y direction from among the displacements of the manipulation body can be detected by the fifth detection body. On the other hand, by locating the detection faces along the XZ plane as depicted in FIG. 11, at least one of the translational movement along the Y direction and the pivotal movement around the axis of pivotal movement along the X direction from among the displacements of the manipulation body can be detected by the fifth detection body. This similarly applies also to the sixth detection body.

Further, by locating the detection faces of the pressure-sensitive elements of the fifth detection body and the detection faces of the pressure-sensitive elements of the sixth detection body along the YZ plane as depicted in FIG. 2, the translational movement along the X direction and the pivotal movement around the axis of pivotal movement along the X direction from among the displacements of the manipulation body can be detected with certainty by the fifth detection body and the sixth detection body.

On the other hand, by locating the detection faces of the pressure-sensitive elements of the fifth detection body and the detection faces of the pressure-sensitive elements of the sixth detection body along the XZ plane as depicted in FIG. 11, the translational movement along the Y direction and the pivotal movement around the axis of pivotal movement along the X direction from among the displacements of the manipulation body can be detected with certainty by the fifth detection body and the sixth detection body.

Furthermore, where two sets of detection bodies having the detection faces along the XY plane, XZ plane and YZ plane are provided by each of the first to sixth detection bodies as depicted in FIG. 12, the translational movements along the XY plane, XZ plane and YZ plane and the pivotal movements around the axes of pivotal movement along the planes just mentioned can be detected by the detection bodies.

Accordingly, even where the paired pressure-sensitive elements are adopted as each of the fifth detection body and the sixth detection body, by locating the fifth detection body and the sixth detection body in such a manner as described above, the number of displacement directions of the manipulation body which can be detected by the detection bodies can be increased further.

On the other hand, if the above-described strain gauge is adopted as the fifth detection body and the sixth detection body, then the displacement directions of the manipulation body can be detected in the following manner. In particular, by locating the detection face of the fifth detection body along the YZ plane as depicted in FIGS. 13 and 16, the translational movement of the manipulation body along the Y direction can be detected by the fifth detection body. Alternatively, by locating the detection face along the XZ plane as depicted in FIG. 15, the translational movement of the manipulation body along the X direction can be detected by the fifth detection body. This similarly applies also to the sixth detection body.

Further, by locating the detection face of the fifth detection body and the detection face of the sixth detection body along the YZ plane as depicted in FIG. 13, the translational movement along the Y direction and the pivotal movement around the axis of pivotal movement along the X direction from among the displacements of the manipulation body can be detected with certainty by the fifth detection body and the sixth detection body. Alternatively, by locating the detection face of the fifth detection body and the detection face of the sixth detection body along the XZ plane as depicted in FIG. 15, the translational movement along the X direction and the pivotal movement around the axis of pivotal movement along the Y direction from among the displacements of the manipulation body can be detected with certainty by the fifth detection body and the sixth detection body.

Furthermore, where two sets of detection bodies having the detection faces along the XY plane, XZ plane and YZ plane are provided by each of the first to sixth detection bodies as depicted in FIG. 16, the translational movements along the XY plane, XZ plane and YZ plane and the pivotal movements around the axes of pivotal movement along the planes just mentioned can be detected by the detection bodies.

Accordingly, even where the strain gauges are adopted as the fifth detection body and the sixth detection body, by locating the fifth detection body and the sixth detection body in such a manner as described above, the number of displacement directions of the manipulation body which can be detected by the detection bodies can be increased further.

Preferably, the manipulator described above is configured such that the detection bodies individually have a pair of pressure-sensitive elements each located such that a detection face thereof which detects pressure when the corresponding bar-shaped portion is abutted with the detection face is directed to the bar-shaped portion. Preferably, the detection faces of such paired pressure-sensitive elements as just described sandwich the corresponding bar-shaped portion therebetween. More preferably, the detection faces extend in parallel to each other.

With such a configuration as just described, since a detection body including a pair of pressure-sensitive elements is adopted, the manipulator can be configured at a low cost in comparison with that in an alternative case in which a detection body including the above-described strain gauge is adopted. Further, processing of a control apparatus which decides a displacement direction of the manipulator based on signals outputted from the detection bodies can be simplified.

Preferably, the manipulator is configured such that the detection faces of the paired pressure-sensitive elements which the first detection body has and the detection faces of the paired pressure-sensitive elements which the second detection body has extend in parallel to each other; the detection faces of the paired pressure-sensitive elements which the third detection body has and the detection faces of the paired pressure-sensitive elements which the fourth detection body has extend in parallel to each other; the detection faces of the paired pressure-sensitive elements which the fifth detection body has and the detection faces of the paired pressure-sensitive elements which the sixth detection body has extend in parallel to each other; and the detection faces of the pressure-sensitive elements which the first detection body has, the detection faces of the pressure-sensitive elements which the third detection body has and the detection faces of the pressure-sensitive elements which the fifth detection body intersect orthogonally with each other.

With such a configuration as described above, the detection face which each of the pressure-sensitive elements of the first detection body has and the detection face which each of the pressure-sensitive elements of the second detection body has extend in parallel to each other. From this, where the detection faces extend along the XZ plane (location state depicted in FIG. 2), the translational movement along the Y direction and the pivotal movement around the axis of pivotal movement along the Z direction from among the displacements of the manipulation body can be detected as described hereinabove. Similarly, where the detection faces extend along the XY plane (location state depicted in FIG. 11), the translational movement along the Z direction and the pivotal movement around the axis of pivotal movement along the Y direction from among the displacements of the manipulation body can be detected as described hereinabove.

Meanwhile, the detection face which each of the pressure-sensitive elements of the third detection body has and the detection face which each of the pressure-sensitive elements of the fourth detection body has extend in parallel to each other. From this, where the detection faces extend along the XY plane (location state depicted in FIG. 2), the translational movement along the Z direction and the pivotal movement around the axis of pivotal movement along the X direction from among the displacements of the manipulation body can be detected as described hereinabove. Similarly, where the detection faces extend along the YZ plane (location state depicted in FIG. 11), the translational movement along the X direction and the pivotal movement around the axis of pivotal movement along the Z direction from among the displacements of the manipulation body can be detected as described hereinabove.

Further, the detection face which each of the pressure-sensitive elements of the fifth detection body has and the detection face which each of the pressure-sensitive elements of the sixth detection body has extend in parallel to each other. From this, where the detection faces extend along the YZ plane (location state depicted in FIG. 2), the translational movement along the X direction and the pivotal movement around the axis of pivotal movement along the Y direction from among the displacements of the manipulation body can be detected as described hereinabove. Similarly, where the detection faces extend along the XZ plane (location state depicted in FIG. 11), the translational movement along the Y direction and the pivotal movement around the axis of pivotal movement along the X direction from among the displacements of the manipulation body can be detected as described hereinabove.

Further, the detection faces of the first detection body and the second detection body, the detection faces of the third detection body and the fourth detection body and the detection faces of the fifth detection body and the sixth detection body intersect orthogonally with each other.

With the configuration just described, where the detection faces of the first detection body and the second detection body extend along the XZ plane as depicted in FIG. 2, the detection faces of the third detection body and the fourth detection body extend along the XY plane and the detection faces of the fifth detection body and the sixth detection body extend along the YZ plane. Therefore, the translational movement along the Y direction and the pivotal movement around the axis of pivotal movement along the Z direction from among the displacements of the manipulation body can be detected by the first detection body and the second detection body. Further, the translational movement along the Z direction and the pivotal movement around the axis of pivotal movement along the X direction from among the displacements of the manipulation body can be detected by the third detection body and the fourth detection body. Furthermore, the translational movement along the X direction and the pivotal movement around the axis of pivotal movement along the Y direction from among the displacements of the manipulation body can be detected by the fifth detection body and the sixth detection body. Accordingly, the displacements of the six axes of the manipulation body can be detected with certainty.

On the other hand, where the detection faces of the first detection body and the second detection body extend along the XY plane as depicted in FIG. 11, the detection faces of the third detection body and the fourth detection body extend along the YZ plane and the detection faces of the fifth detection body and the sixth detection body extend along the XZ plane. Therefore, the translational movement along the Z direction and the pivotal movement around the axis of pivotal movement along the Y direction from among the displacements of the manipulation body can be detected by the first detection body and the second detection body as described hereinabove. Further, the translational movement along the X direction and the pivotal movement around the axis of pivotal movement along the Z direction from among the displacements of the manipulation body can be detected by the third detection body and the fourth detection body. Furthermore, the translational movement along the Y direction and the pivotal movement around the axis of pivotal movement along the X direction from among the displacements of the manipulation body can be detected by the fifth detection body and the sixth detection body.

Accordingly, the displacements of the six axes of the manipulation body can be detected with certainty.

Alternatively, the manipulator is configured preferably such that the detection faces of the paired pressure-sensitive elements which the first detection body has and the detection faces of the paired pressure-sensitive elements which the second detection body has intersect orthogonally with each other; the detection faces of the paired pressure-sensitive elements which the third detection body has and the detection faces of the paired pressure-sensitive elements which the fourth detection body has intersect orthogonally with each other; the detection faces of the paired pressure-sensitive elements which the fifth detection body has and the detection faces of the paired pressure-sensitive elements which the sixth detection body has intersect orthogonally with each other; and the detection faces of the pressure-sensitive elements which the first detection body has, the detection faces of the pressure-sensitive elements which the third detection body has and the detection faces of the pressure-sensitive elements which the fifth detection body intersect orthogonally with each other.

With such a configuration as just described, since the detection faces of the paired pressure-sensitive elements which the first detection body has and the detection faces of the paired pressure-sensitive elements which the second detection body has intersect orthogonally with each other, ones of the detection faces of the first detection body and the detection faces of the second detection body extend along the XY plane while the others extend along the XZ plane.

Further, since the detection faces of the paired pressure-sensitive elements which the third detection body has and the detection faces of the paired pressure-sensitive elements which the fourth detection body has intersect orthogonally with each other, ones of the detection faces of the third detection body and the detection faces of the fourth detection body extend along the XY plane while the others extend along the YZ plane.

Furthermore, since the detection faces of the paired pressure-sensitive elements which the fifth detection body has and the detection faces of the paired pressure-sensitive elements which the sixth detection body has intersect orthogonally with each other, ones of the detection faces of the fifth detection body and the detection faces of the sixth detection body extend along the XZ plane while the others extend along the YZ plane. Consequently, the detection faces of one of the first detection body and the second detection body, the detection faces of one of the third detection body and the fourth detection body and the detection faces of one of the fifth detection body and the sixth detection body intersect orthogonally with each other.

From among the detection faces located in this manner, the detection faces of one of the first detection body and the second detection body (in FIG. 12, the detection faces of the second detection body) and the detection faces of one of the third detection body and the fourth detection body (in FIG. 12, the detection faces of the third detection body) extend along the XY plane. Further, the detection faces of the other of the first detection body and the second detection body (in FIG. 12, the detection faces of the first detection body) and the detection faces of one of the fifth detection body and the sixth detection body (in FIG. 12, the detection faces of the sixth detection body) extend along the XZ plane. Furthermore, the detection faces of the other of the third detection body and the fourth detection body (in FIG. 12, the detection faces of the fourth detection body) and the detection faces of the other of the fifth detection body and the sixth detection body (in FIG. 12, the detection faces of the fifth detection body) extend along the YZ plane.

Therefore, the translational movement of the manipulation body along the Z direction can be detected by the two detection bodies whose detection faces individually extend along the XY plane. Further, the translational movement of the manipulation body along the Y direction can be detected by the two detection bodies whose detection faces individually extend along the XZ plane. Furthermore, the translational movement of the manipulation body along the X direction can be detected by the two detection bodies whose detection faces individually extend along the YZ plane.

In addition, by two detection bodies whose detection faces intersect orthogonally with each other, from among the displacements of the manipulation body, the pivotal movement of the bar-shaped portions, which have an axis of pivotal movement in a direction along a line of intersection between the detection faces orthogonally intersecting with each other and intersect orthogonally with the two bar-shaped portions corresponding to the two detection bodies, around the axis of pivotal movement along the extension direction of the bar-shaped portions. Accordingly, the manipulator can detect the displacements of the six axes of the manipulation body with certainty similarly to the above-described manipulator.

Preferably, the manipulator is configured such that a gap between the detection face of one of the paired pressure-sensitive elements and the bar-shaped portion and a gap between the detection face of the other one of the paired pressure-sensitive elements and the bar-shaped portion have dimensions equal to each other.

With such a configuration as just described, the displacement amount of the manipulation body when a pressure-sensitive element is pressed can be made equal between a case in which one of the detection faces is pressed and another case in which the other of the detection faces is pressed. Consequently, also the pressures detected by the pressure-sensitive elements have an equal value with respect to an equal displacement amount. Accordingly, the displacement direction of the manipulation body can be detected with a higher degree of accuracy.

Preferably, the manipulator is configured such that it has a position holding member which positions the bar-shaped portion between the paired pressure-sensitive elements.

As such a position holding member just mentioned, a member configured from a spring or the like which exerts biasing force to act upon the bar-shaped portion to return the bar-shaped portion to its initial position and an elastic body configured from an elastic material such as rubber and configured to exert elastic force to act upon the bar-shaped member to return the bar-shaped member to its initial position can be exemplified.

With such a configuration as just described, in a state in which the manipulator is not manipulated by the user, the bar-shaped portion can be positioned between the paired pressure-sensitive elements by the position holding member. Accordingly, the manipulation body can be returned to the initial position and the operability of the manipulator can be improved.

Preferably, the manipulator is configured such that each of the detection bodies outputs, when the bar-shaped portion contacts with one of the detection faces of the paired pressure-sensitive elements, a second voltage higher than a first voltage which is outputted when the bar-shaped portion contacts with the other one of the detection faces, but outputs, when the bar-shaped portion does not contact with any of the detection faces which the paired pressure-sensitive elements, a reference voltage having an intermediate value between the first voltage and the second voltage.

Here, where the detection state by each pressure-sensitive element is outputted as a signal to the aforementioned control apparatus, it is necessary to provide a number of signal lines corresponding to the number of pressure-sensitive elements. In such a case, since the number of signal lines is great, the location and so forth of the signal lines are complicated. Further, signal processing by the control apparatus is complicated. In contrast, in the manipulator, one of the first voltage, second voltage and reference voltage is outputted from the paired pressure-sensitive elements to output a detection state by the paired pressure sensitive elements. Therefore, the number of signal lines can be reduced, and signal processing by the control apparatus can be simplified.

Meanwhile, the above-described manipulation apparatus is characterized in that it includes any of the above-described manipulators.

With this manipulation apparatus, effects similar to those achieved by the above-described manipulator, and consequently, the versatility of the manipulation apparatus can be improved.

INDUSTRIAL APPLICABILITY

The present invention can be utilized for a manipulator provided in a manipulation apparatus and can be suitably utilized particularly for a manipulation apparatus (controller) connected to an information processing apparatus such as a PC or a game apparatus.

REFERENCE SIGNS LIST

1 . . . Manipulation apparatus; 3, 3A to 3E . . . Manipulator; 6 (6X, 6Y, 6Z) . . . Position holding member; 31 . . .

Manipulation body; 33, 36 . . . Detection body; 32 (32X, 32Y, 32Z) . . . Bar-shaped portion (first bar-shaped portion, second bar-shaped portion, third bar-shaped portion); 33X1, 36X1 . . . First detection body; 33X2, 36X2 . . . Second detection body; 33Y1, 36Y1 . . . Third detection body; 33Y2, 36Y2 . . . Fourth detection body; 33Z1, 36Z1 . . . Fifth detection body; 33Z2, 36Z2 . . . Sixth detection body; S (SX11, SX12, SX21, SX22, SY11, SY12, SY21, SY22, SZ11, SZ12, SZ21, SX22) . . . Pressure-sensitive element; DF, SF . . . Detection face; P . . . Intersection point.

The invention claimed is:

1. A manipulator comprising:
a manipulation body having a plurality of bar-shaped portions which intersect orthogonally with each other at one intersection point; and
a plurality of detection bodies which detect a displacement of the manipulation body;
the plural bar-shaped portions including: (i) a first bar-shaped portion and a second bar-shaped portion which intersect orthogonally with each other, and (ii) a third bar-shaped portion intersecting orthogonally with the first bar-shaped portion and the second bar-shaped portion at the intersection point;
the plural detection bodies including: (i) a first detection body which detects a displacement of one end side of the first bar-shaped portion with respect to the intersection point, (ii) a second detection body which detects a displacement of the other end side of the first bar-shaped portion with respect to the intersection point, (iii) a third detection body which detects a displacement of one end side of the second bar-shaped portion with respect to the intersection point, (iv) a fourth detection body which detects a displacement of the other end side of the second bar-shaped portion with respect to the intersection point, (v) a fifth detection body which detects a displacement of one end side of the third bar-shaped portion with respect to the intersection point, and (vi) a sixth detection body which detects a displacement of the other end side of the third bar-shaped portion with respect to the intersection point;
each of the plurality of detection bodies include at least one pressure-sensitive element located such that a detection face thereof which detects pressure when the corresponding bar-shaped portion is abutted with the detection face is directed to the bar-shaped portion, wherein:
the detection face of the at least one pressure-sensitive element which the first detection body has and the detection face of the pressure-sensitive element which the second detection body has define respective planes that intersect orthogonally with one another;
the detection face of the at least one pressure-sensitive element which the third detection body has and the detection face of the at least one pressure-sensitive element which the fourth detection body has define respective planes that intersect orthogonally with one another;
the detection face of the at least one pressure-sensitive element which the fifth detection body has and the detection face of the at least one pressure-sensitive element which the sixth detection body has define respective planes that intersect orthogonally with one another; and
the detection face of the at least one pressure-sensitive element which the first detection body has, the detection face of the at least one pressure-sensitive element which the third detection body has, and the detection face of the at least one pressure-sensitive element which the fifth detection body has define respective planes that intersect orthogonally with one another.

2. The manipulator according to claim 1, wherein each of the plurality of detection bodies have a pair of the pressure-sensitive elements.

3. The manipulator according to claim 2, wherein
the detection faces of the paired pressure-sensitive elements which the first detection body has and the detection faces of the paired pressure-sensitive elements which the second detection body has intersect orthogonally with each other;
the detection faces of the paired pressure-sensitive elements which the third detection body has and the detection faces of the paired pressure-sensitive elements which the fourth detection body has intersect orthogonally with each other;
the detection faces of the paired pressure-sensitive elements which the fifth detection body has and the detection faces of the paired pressure-sensitive elements which the sixth detection body has intersect orthogonally with each other; and
the detection faces of the pressure-sensitive elements which the first detection body has, the detection faces of the pressure-sensitive elements which the third detection body has and the detection faces of the pressure-sensitive elements which the fifth detection body has intersect orthogonally with each other.

4. The manipulator according to claim 2, wherein a gap between the detection face of one of the paired pressure-sensitive elements and the bar-shaped portion and a gap between the detection face of the other one of the paired pressure-sensitive elements and the bar-shaped portion have dimensions equal to each other.

5. The manipulator according to claim 2, wherein the manipulator has a position holding member which positions the bar-shaped portion between the paired pressure-sensitive elements.

6. The manipulator according to claim 2, wherein each of the detection bodies:
outputs, when the bar-shaped portion contacts with one of the detection faces of the paired pressure-sensitive elements, a second voltage higher than a first voltage which is outputted when the bar-shaped portion contacts with the other one of the detection faces, and
outputs, when the bar-shaped portion does not contact with any of the detection faces which the paired pressure-sensitive elements has, a reference voltage having an intermediate value between the first voltage and the second voltage.

7. A manipulation apparatus including the manipulator of claim 1.

* * * * *